US012626121B1

(12) United States Patent (10) Patent No.: US 12,626,121 B1

Tantiongloc et al. (45) Date of Patent: May 12, 2026

(54) EXECUTION OF MACHINE-TRAINED NETWORK

(71) Applicant: Amazon Technologies, Inc., Seattle, WA (US)

(72) Inventors: Justin Tantiongloc, San Jose, CA (US); Brian Thomas, Vancouver (CA); Steven L. Teig, Menlo Park, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1102 days.

(21) Appl. No.: 17/199,220

(22) Filed: Mar. 11, 2021

Related U.S. Application Data

(60) Provisional application No. 63/117,976, filed on Nov. 24, 2020.

(51) Int. Cl.
    *G06N 3/08*     (2023.01)
    *G06N 3/04*     (2023.01)

(52) U.S. Cl.
    CPC ................. *G06N 3/08* (2013.01); *G06N 3/04* (2013.01)

(58) Field of Classification Search
    CPC .......... G06N 3/08; G06N 3/04; G06N 3/0464; G06N 3/0475; G06N 3/0495; G06N 3/0499; G06N 3/0895; G06N 3/09; G06N 3/091; G06N 3/092; G06N 3/094; G06N 3/096; G06N 3/098; G06N 3/0985

See application file for complete search history.

(56) References Cited

U.S. PATENT DOCUMENTS

| | | | |
|---|---|---|---|
| 5,956,703 | A | 9/1999 | Turner et al. |
| 9,904,874 | B2 | 2/2018 | Shoaib et al. |
| 10,664,310 | B2 | 5/2020 | Bokhari |
| 11,210,586 | B1 | 12/2021 | Duong |
| 11,468,145 | B1 | 10/2022 | Duong |
| 11,481,612 | B1 * | 10/2022 | Duong ................ G06F 9/30134 |
| 11,537,853 | B1 | 12/2022 | Afzal |
| 11,568,227 | B1 | 1/2023 | Ko |
| 11,868,867 | B1 | 1/2024 | Afzal |
| 11,977,916 | B2 | 5/2024 | Kim |
| 11,995,533 | B1 | 5/2024 | Sather |
| 2014/0180987 | A1 | 6/2014 | Arthur et al. |

(Continued)

OTHER PUBLICATIONS

Subramaniam, Arulkumar, Vismay Patel, Ashish Mishra, Prashanth Balasubramanian, and Anurag Mittal. n.d. "Bi-Modal First Impressions Recognition Using Temporally Ordered Deep Audio and Stochastic Visual Features." Accessed Apr. 5, 2024. https://arxiv.org/pdf/1610.10048.pdf. (Year: 2016).*

(Continued)

*Primary Examiner* — Usmaan Saeed
*Assistant Examiner* — Su-Ting Chuang
(74) *Attorney, Agent, or Firm* — K&L Gates LLP

(57) ABSTRACT

Some embodiments provide a method for executing a machine-trained (MT) network that includes multiple layers. For an input set for the network divided into at least two blocks of input data, the method propagates each respective block of the input data separately through a first set of the layers of the MT network to generate respective blocks of intermediate data. The method combines the blocks of intermediate data into a set of intermediate data. The method propagates the set of intermediate data together through a second set of the layers of the MT network to generate output data for the input set.

20 Claims, 25 Drawing Sheets

(56) References Cited

U.S. PATENT DOCUMENTS

| | | | |
|---|---|---|---|
| 2016/0342893 | A1 | 11/2016 | Ross et al. |
| 2017/0011006 | A1 | 1/2017 | Saber et al. |
| 2018/0032846 | A1 | 2/2018 | Yang et al. |
| 2018/0293691 | A1* | 10/2018 | Nurvitadhi ............... G06T 1/60 |
| 2018/0307950 | A1 | 10/2018 | Nealis et al. |
| 2019/0095776 | A1 | 3/2019 | Kfir et al. |
| 2019/0114499 | A1 | 4/2019 | Delaye et al. |
| 2019/0130265 | A1 | 5/2019 | Ling |
| 2019/0180176 | A1 | 6/2019 | Yudanov et al. |
| 2019/0205780 | A1 | 7/2019 | Sakaguchi |
| 2019/0294968 | A1 | 9/2019 | Vantrease et al. |
| 2019/0354868 | A1 | 11/2019 | Wierstra et al. |
| 2020/0005128 | A1 | 1/2020 | Temam |
| 2020/0042856 | A1 | 2/2020 | Datta et al. |
| 2020/0125926 | A1 | 4/2020 | Choudhury |
| 2020/0272907 | A1 | 8/2020 | Jin |
| 2020/0301739 | A1 | 9/2020 | Xu |
| 2021/0182684 | A1 | 6/2021 | Zappi |
| 2021/0232897 | A1 | 7/2021 | Bichler |
| 2021/0287074 | A1 | 9/2021 | Coenen |
| 2022/0004854 | A1 | 1/2022 | Lee |
| 2022/0335272 | A1 | 10/2022 | Elsen |
| 2022/0414437 | A1 | 12/2022 | Liu |

OTHER PUBLICATIONS

Renzo Andri, Lukas Cavigelli, Davide Rossi, and Luca Benini. 2018. "YodaNN: An Architecture for Ultralow Power Binary-Weight CNN Acceleration." IEEE Transactions on Computer-Aided Design of Integrated Circuits and Systems 37 (1): 48-60. https://doi.org/10.1109/tcad.2017.2682138. (Year: 2018).*

Nguyen ("A High-Throughput and Power-Efficient FPGA Implementation of YOLO CNN for Object Detection") IEEE Transactions on Very Large Scale Integration (VLSI) Systems, vol. 27, No. 8, Aug. 2019 (Year: 2019).*

Zhang ("Frequency Domain Acceleration of Convolutional Neural Networks on CPU-FPGA Shared Memory System") FPGA '17, Feb. 22-24, 2017, Monterey, CA, USA (Year: 2017).*

Wi ("Compressing sparse ternary weight convolutional neural networks for efficient hardware acceleration") 978-1-7281-2954-9/19/$31.00 © 2019 IEEE (Year: 2019).*

Cho ("MEC: Memory-efficient Convolution for Deep Neural Network") Proceedings of the 34 th International Conference on Machine Learning, Sydney, Australia, PMLR 70, 2017. (Year: 2017).*

Fan ("RED: A ReRAM-based Deconvolution Accelerator") 978-3-9819263-2-3/Date19/c 2019 EDAA (Year: 2019).*

Alwani ("Fused-layer CNN accelerators") 2016 49th Annual IEEE/ACM International Symposium on Microarchitecture (MICRO) (Year: 2016).*

Zheng ("Efficient Scheduling of Irregular Network Structures on CNN Accelerators") IEEE Transactions on Computer-Aided Design of Integrated Circuits and Systems, vol. 39, No. 11, Nov. 2020, Date of publication Oct. 2, 2020 (Year: 2020).*

Szegedy ("Inception-v4, Inception-ResNet and the Impact of Residual Connections on Learning") Proceedings of the Thirty-First AAAI Conference on Artificial Intelligence (AAAI-17) (Year: 2017).*

Han ("CNN-MERP: An FPGA-based memory-efficient reconfigurable processor for forward and backward propagation of convolutional neural networks") 2016 IEEE 34th International Conference on Computer Design (ICCD) (Year: 2016).*

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Chen, Tianqi, et al., "Training Deep Nets with Sublinear Memory Cost," Apr. 22, 2016, 12 pages, arXiv:1604.06174v2, Computer Research Repository (CoRR)—Cornell University, Ithaca, NY, USA.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Cho, Minsik, et al., "MEC: Memory-Efficient Convolution for Deep Neural Network," Jun. 21, 2017, 10 pages, arXiv:1706.06873v1, Computer Research Repository (CoRR)—Cornell University, Ithaca, NY, USA.

Courbariaux, Matthieu, et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Fu, Yao, et al., "Embedded Vision with INT8 Optimization on Xilinx Devices," WP490 (v1.0.1), Apr. 19, 2017, 15 pages, Xilinx, Inc., San Jose, CA, USA.

Gao, Mingyu, et al., "Tetris: Scalable and Efficient Neural Network Acceleration with 3D Memory," Proceedings of the 22nd International Conference on Architectural Support for Programming Languages and Operating Systems (ASPLOS '17), Apr. 8-12, 2017, 14 pages, ACM, Xi'an, China.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

Hanlon, Jamie, "Why is So Much Memory Needed for Deep Neural Networks?," Jan. 31, 2017, 6 pages, Graphcore, Bristol, United Kingdom, retrieved from https://www.graphcore.ai/posts/why-is-so-much-memory-needed-for-deep-neural-networks.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Jain, Anil K., et al., "Artificial Neural Networks: A Tutorial," Computer, Mar. 1996, 14 pages, vol. 29, Issue 3, IEEE.

Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

Kong, Chen, et al., "Take it in your stride: Do we need striding in CNNs?," Dec. 7, 2017, 9 pages, arXiv:1712.02502v1, Computer Research Repository (CoRR)—Cornell University, Ithaca, NY, USA.

Moons, Bert, et al., "Envision: A 0.26-to-10TOPS/W Subword-Parallel Dynamic-Voltage-Accuracy-Frequency-Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.

(56)         References Cited

OTHER PUBLICATIONS

Moshovos, Andreas, et al., "Exploiting Typical Values to Accelerate Deep Learning," Computer, May 24, 2018, 13 pages, vol. 51—Issue 5, IEEE Computer Society, Washington, D.C.

Non-Published Commonly Owned Related U.S. Appl. No. 17/199,221 with similar specification, filed Mar. 11, 2021, 92 pages, Perceive Corporation.

Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.

Pedram, Ardavan, et al., "Dark Memory and Accelerator-Rich System Optimization in the Dark Silicon Era," Apr. 27, 2016, 8 pages, arXiv:1602.04183v3, Computer Research Repository (CoRR)—Cornell University, Ithaca, Ny, Jsa.

Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.

Sim, Jaehyeong, et al., "A 1.42TOPS/W Deep Convolutional Neural Network Recognition Processor for Intelligent IoE Systems," Pro-ceedings of 2016 IEEE International Solid-State Circuits Conference (ISSCC 2016), Jan. 31-Feb. 4, 2016, 3 pages, IEEE, San Francisco, CA, USA.

Srivastava, Rupesh Kumar, et al., "Highway Networks," Nov. 3, 2015, 6 pages, arXiv:1505.00387v2, Computer Research Repository (CoRR)—Cornell University, Ithaca, NY, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.

Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.

Zilly, Julian Georg, et al., "Recurrent Highway Networks," Jul. 4, 2017, 12 pages, arXiv:1607.03474v5, Computer Research Repository (CoRR)—Cornell University, Ithaca, NY, USA.

Ardakani, Arash, et al., "An Architecture to Accelerate Convolution in Deep Neural Networks," IEEE Transactions on Circuits and Systems I: Regular Papers, Oct. 17, 2017, 14 pages, vol. 65, No. 4, IEEE.

* cited by examiner

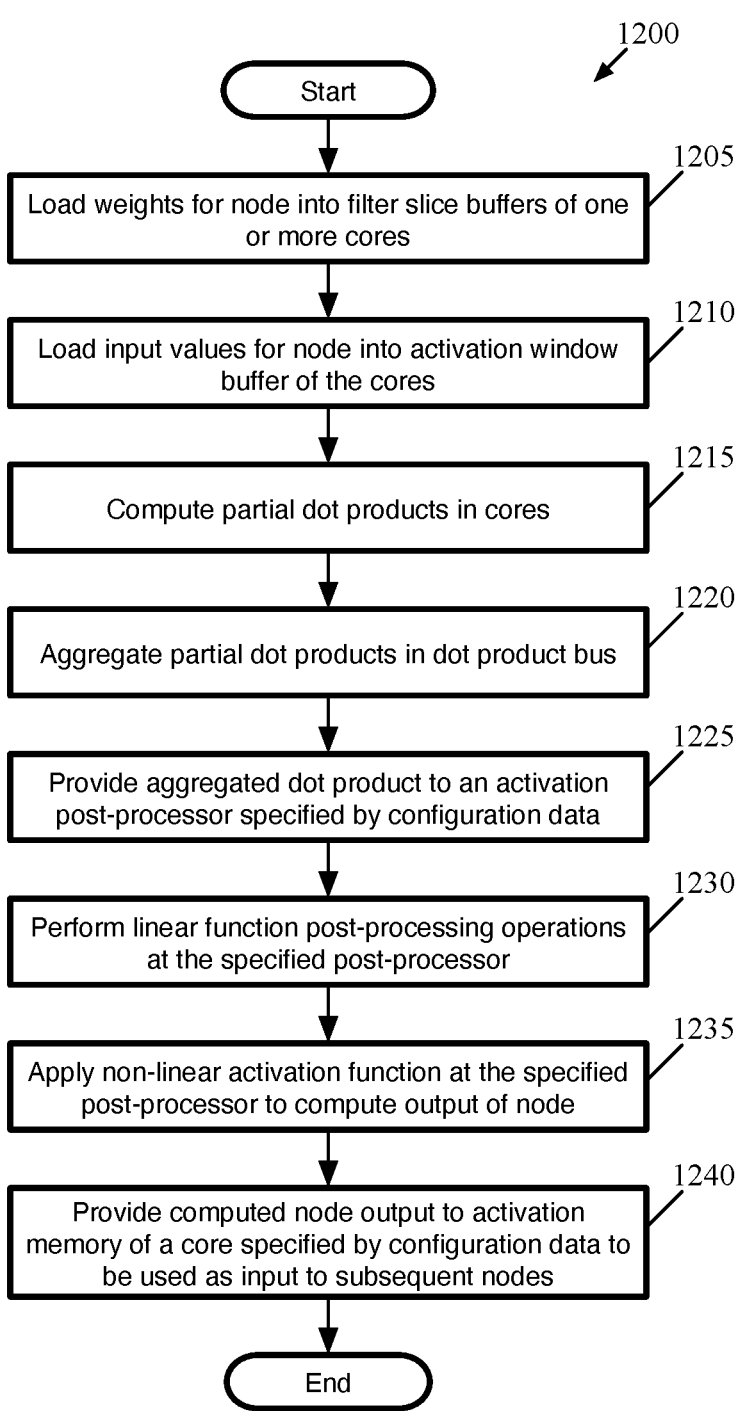

*1200*

Start

Load weights for node into filter slice buffers of one or more cores — 1205

Load input values for node into activation window buffer of the cores — 1210

Compute partial dot products in cores — 1215

Aggregate partial dot products in dot product bus — 1220

Provide aggregated dot product to an activation post-processor specified by configuration data — 1225

Perform linear function post-processing operations at the specified post-processor — 1230

Apply non-linear activation function at the specified post-processor to compute output of node — 1235

Provide computed node output to activation memory of a core specified by configuration data to be used as input to subsequent nodes — 1240

End

| 0,0,31 | 1,0,31 | 2,0,31 | 3,0,31 | 4,0,31 | 5,0,31 |
| 0,1,31 | 1,1,31 | 2,1,31 | 3,1,31 | 4,1,31 | 5,1,31 |
| 0,2,31 | 1,2,31 | 2,2,31 | 3,2,31 | 4,2,31 | 5,2,31 |
| 0,3,31 | 1,3,31 | 2,3,31 | 3,3,31 | 4,3,31 | 5,3,31 |
| 0,4,31 | 1,4,31 | 2,4,31 | 3,4,31 | 4,4,31 | 5,4,31 |
| 0,5,31 | 1,5,31 | 2,5,31 | 3,5,31 | 4,5,31 | 5,5,31 |

Layer K Activations
(Outputs of Layer K-1)

| 0,0,1 | 1,0,1 | 2,0,1 | 3,0,1 | 4,0,1 | 5,0,1 |
| 0,1,1 | 1,1,1 | 2,1,1 | 3,1,1 | 4,1,1 | 5,1,1 |
| 0,2,1 | 1,2,1 | 2,2,1 | 3,2,1 | 4,2,1 | 5,2,1 |
| 0,3,1 | 1,3,1 | 2,3,1 | 3,3,1 | 4,3,1 | 5,3,1 |
| 0,4,1 | 1,4,1 | 2,4,1 | 3,4,1 | 4,4,1 | 5,4,1 |
| 0,5,1 | 1,5,1 | 2,5,1 | 3,5,1 | 4,5,1 | 5,5,1 |

| 0,0,0 | 1,0,0 | 2,0,0 | 3,0,0 | 4,0,0 | 5,0,0 |
| 0,1,0 | 1,1,0 | 2,1,0 | 3,1,0 | 4,1,0 | 5,1,0 |
| 0,2,0 | 1,2,0 | 2,2,0 | 3,2,0 | 4,2,0 | 5,2,0 |
| 0,3,0 | 1,3,0 | 2,3,0 | 3,3,0 | 4,3,0 | 5,3,0 |
| 0,4,0 | 1,4,0 | 2,4,0 | 3,4,0 | 4,4,0 | 5,4,0 |
| 0,5,0 | 1,5,0 | 2,5,0 | 3,5,0 | 4,5,0 | 5,5,0 |

*Figure 14*

EXECUTION OF MACHINE-TRAINED NETWORK

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), and Neural Turing Machines (NTM).

These neural networks typically involve many weights that are calculated during training and then used when the neural network is embedded into a device. For instance, layers in a ResNet50 network (a known network architecture for image analysis) may have up to 512 3×3 kernels (which may have a depth up to 512) in a single layer, which would include over 2 million weights in a single layer. These weights, along with intermediate activation data, need to be stored on the neural network execution fabric of a device. Recently, techniques have been introduced to solve this issue in part by creating very sparse networks (i.e., with most weight values set to zero), which saves space. However, techniques for reducing the storage of intermediate activation data would also be helpful.

BRIEF SUMMARY

Some embodiments of the invention provide a method for executing a machine-trained (MT) network (e.g., a neural network) by dividing the input to the network into multiple blocks and propagating each block separately through a portion of the network. In so doing, the maximum amount of intermediate activation values requiring storage at one time is reduced, thereby enabling a larger portion of a fixed amount of memory to be allocated to storage of weight values. Specifically, for a first portion of the network (e.g., a first set of layers of the network), each block of the input data is propagated separately to generate respective blocks of intermediate data. These blocks of intermediate data are then combined, and the combined data is propagated together through a second portion of the network (e.g., a second set of layers) to generate network output data for the input.

In some embodiments, the MT network is a convolutional neural network. Such a neural network propagates an input data set through a series of layers (e.g., convolutional layers, pooling layers, element-wise operation layers) to generate output data. Convolutional neural networks are often used for image processing and/or analysis. A typical convolutional layer takes as input a set of input activations arranged in one or more channels, each channel being a two-dimensional grid of activation values (e.g., an input image with 320×240 pixels would be arranged as three 320×240 channels, one channel each for the red, green, and blue channels). One or more (typically many) filters of weight values are convolved over the input activation values to compute dot products, to which additional operations (e.g., shift, scale, non-linear activation function) are applied to generate output activations. Each filter produces a channel of output activations, which are used as inputs to a subsequent layer (typically the next layer of the network).

In some embodiments, the weight values and/or activation values within the network are quantized for use on a particular device. Specifically, some embodiments quantize activation values to a particular number of bits (e.g., 4 bits) during the execution of the network. For weight values, some embodiments use binary or ternary weight values. Binary weight values are typically trained such that each weight is either 0 or 1, and ternary weight values are typically trained such that each weight value is one of the set {0, 1, −1}. In either case, the weight values may be multiplied by a scale value determined for a layer or channel. To save memory, some embodiments train the networks to be extremely sparse, with a large majority (e.g., 85%, 90%) of the weights set to 0 (rather than 1 or −1). In some such embodiments, the weights are stored on the device (e.g., in the memory of a neural network inference circuit embedded in the device) in an encoded manner such that zero-value weights require less memory than non-zero weights. These networks can still be very predictive, but at the margins decreasing sparsity (e.g., from 90% to 85%) improves prediction accuracy.

The neural network inference circuit of some embodiments that stores the weight and activation values during execution has a fixed amount of available memory for these values. In some embodiments, the neural network inference circuit stores the weights for all layers in memory for the entirety of the execution of the network, while the activation values are only stored as long as they are needed (e.g., for one or two layers in many cases) and then overwritten by activation values of later layers. The weight values are loaded into memory when the neural network inference circuit is initially powered up and remain until the circuit is powered off. When the neural network inference circuit executes a network for a particular input set (e.g., an image of a video stream), the input set is loaded into activation memory of the circuit, and then propagated through the network. This input set, like the other layers of activation values, can be overwritten once the data is no longer needed. Given these conditions, the amount of memory available for storing the weight values is limited by the layers with the largest number of activation values (assuming each activation is quantized to a fixed size). That is, the amount of memory available for storing weight values is the total amount of weight/activation memory available in the neural network inference circuit minus the maximum memory required for storing activation values during the course of executing the network. Thus, if this maximum activation memory requirement can be decreased (without affecting the network quality), then more nonzero weights can be stored for a network of a given size, thereby allowing for a less sparse network to be executed by the neural network inference circuit.

Some embodiments decrease this maximum activation memory requirement by propagating the input set through a portion of the network in blocks. Typically, the largest activation memory usage occurs during the first few layers of the network. Convolutional layers will often decrease the size of the channels (e.g., after several layers a 320×240 input channel size might have decreased to 80×60). While the input set is typically not as memory-intensive because there are only three channels, the structure of convolutional networks is such that the number of channels quickly increases (e.g., to hundreds of channels) before the channel size substantially decreases.

Thus, some embodiments propagate the input set through a first set of the layers of the network in blocks. This increases the time required to execute the network (because weights for these layers have to be loaded from memory into weight buffers multiple times) with the benefit that more memory is available for storing the weights. In some embodiments, due to the nature of convolutional layers as well as how the activation values are stored and how these layers are executed by the neural network inference circuit, the input set is divided into blocks such that rows of input activations are kept together within a block. Specifically, as mentioned, a set of activations for a layer is treated as multiple equal-size channels, with each channel organized as a row/column grid. A filter (set of weights used for dot products) typically has dimensions of k×k×c (where c is the number of input channels), and is convolved over k rows at once, then moved down by a predetermined amount to be convolved over the next set of rows. Additionally, some embodiments store the activation values in memory in channel-row-column order. That is, all of (or groups of) the values with the same (x, y) coordinates are stored together in groups, with these coordinate groups next ordered by row. Given this structure, some embodiments divide an X×Y×C set of input values into multiple X×$Y_1$×C blocks, where $Y_1$ is less than Y (e.g., ½, ⅓, ¼, etc.).

These blocks of input data sets, after propagation through the first set of layers of the network, generate separate sets of intermediate activation values which are similarly related (i.e., the blocks are also divided into separate rows). The neural network inference circuit then combines the blocks into a single set of intermediate activation values and propagates these intermediate activation values through the remainder of the network. In some embodiments, combining the blocks simply requires setting configuration data to treat the blocks as a single set of activation values for input to the next layer of the network. In other embodiments, combining the blocks also requires moving some of the activation values within memory.

It should be noted that in some embodiments, the division of the input data is such that the blocks have partial overlaps. In many networks, the generation of the intermediate activation values for a first block at the end of the first set of layers requires certain input data that is also used to generate the intermediate values for a second block. Again viewing each channel as a two-dimensional grid of activation values, the bottom rows of the top block require some of the same input activation values as the top rows of the next block. Some embodiments identify the receptive field within the input activations for each intermediate activation value output by the last of the first set of layers and ensure that all of the input activation values required to compute each block of intermediate activation values for a block are included in the corresponding input block. This creates a certain amount of overhead in that certain calculations are performed multiple times (e.g., for two different blocks) and the overlapping activation values are stored in and loaded from memory multiple times. However, in many cases this overhead is worth the increase in weight memory storage.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 12 conceptually illustrates a process of some embodiments for executing a set of instructions (or a portion of a set of instructions) to compute the output of a neural network node.

FIG. 14 conceptually illustrates a layer of activation values.

DETAILED DESCRIPTION

Some embodiments of the invention provide a method for executing a machine-trained (MT) network (e.g., a neural network) by dividing the input to the network into multiple blocks and propagating each block separately through a portion of the network. In so doing, the maximum amount of intermediate activation values requiring storage at one time is reduced, thereby enabling a larger portion of a fixed amount of memory to be allocated to storage of weight values. Specifically, for a first portion of the network (e.g., a first set of layers of the network), each block of the input data is propagated separately to generate respective blocks of intermediate data. These blocks of intermediate data are then combined, and the combined data is propagated together through a second portion of the network (e.g., a second set of layers) to generate network output data for the input.

In some embodiments, the MT network is a convolutional neural network. Such a neural network propagates an input data set through a series of layers (e.g., convolutional layers, pooling layers, element-wise operation layers) to generate output data. Convolutional neural networks are often used for image processing and/or analysis. A typical convolutional layer takes as input a set of input activations arranged in one or more channels, each channel being a two-dimensional grid of activation values (e.g., an input image with 320×240 pixels would be arranged as three 320×240 channels, one channel each for the red, green, and blue channels). One or more (typically many) filters of weight values are convolved over the input activation values to compute dot products, to which additional operations (e.g., shift, scale, non-linear activation function) are applied to generate output activations. Each filter produces a channel of output activations, which are used as inputs to a subsequent layer (typically the next layer of the network).

Figure 1:
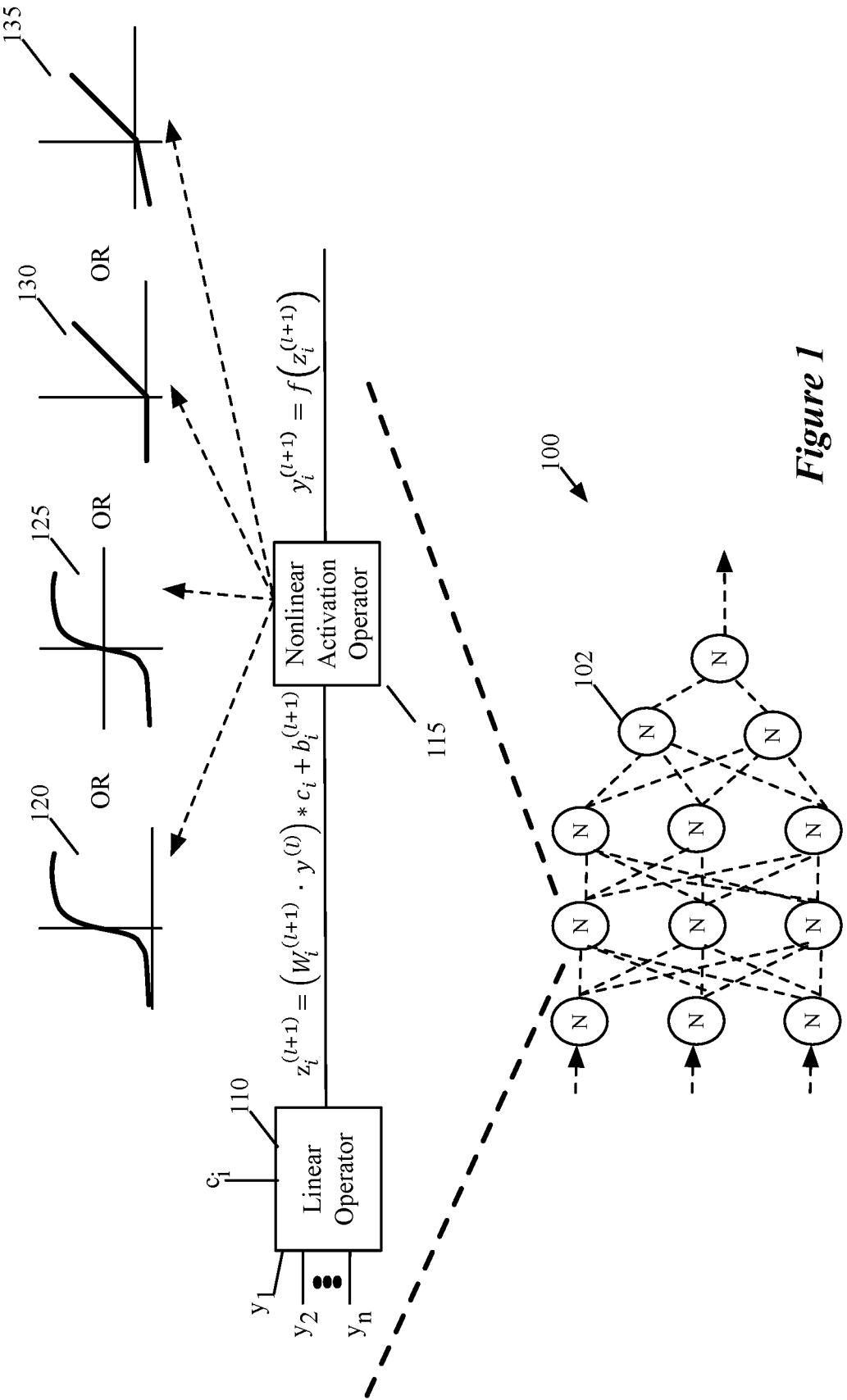
FIG. 1 illustrates an example of a multi-layer machine-trained network of some embodiments.

Such machine-trained networks will first be described in greater detail. FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.). The propagation of input data through a first portion of the network in separate blocks can work for any type of network so long as that first portion is isolated from the second portion of the network (i.e., so long as the intermediate data computed and then used within the first portion is not required for the second portion, other than intermediate data computed by the last layer of the first portion of the network).

The illustrated network 100 is a fully-connected network in which each node in a particular layer receives as inputs all of the outputs from the previous layer. However, as mentioned, the neural networks of some embodiments are convolutional feed-forward neural networks. In this case, the intermediate layers (referred to as "hidden" layers) may include convolutional layers, pooling layers, element-wise operation layers, fully-connected layers, and/or normalization layers. The convolutional layers of some embodiments use a small kernel (e.g., 2×2, 3×3, 5×5, etc.) to process blocks of input values (output values from a previous layer) in a set of two-dimensional grids (e.g., channels of pixels of an image, input feature maps) with the same set of parameters. The kernels (also referred to as filters) are three-dimensional, and multiple kernels are used to process each group of input values in a layer (resulting in a set of three-dimensional output grids, also referred to as output feature maps). Pooling layers combine clusters of outputs from one layer into a single node at the next layer, as part of the process of reducing an image (which may have a large number of pixels) or other input item down to a smaller size (e.g., a vector output). In some embodiments, pooling layers can use max pooling (in which the maximum value among the clusters of node outputs is selected) or average pooling (in which the clusters of node outputs are averaged).

Figure 2:
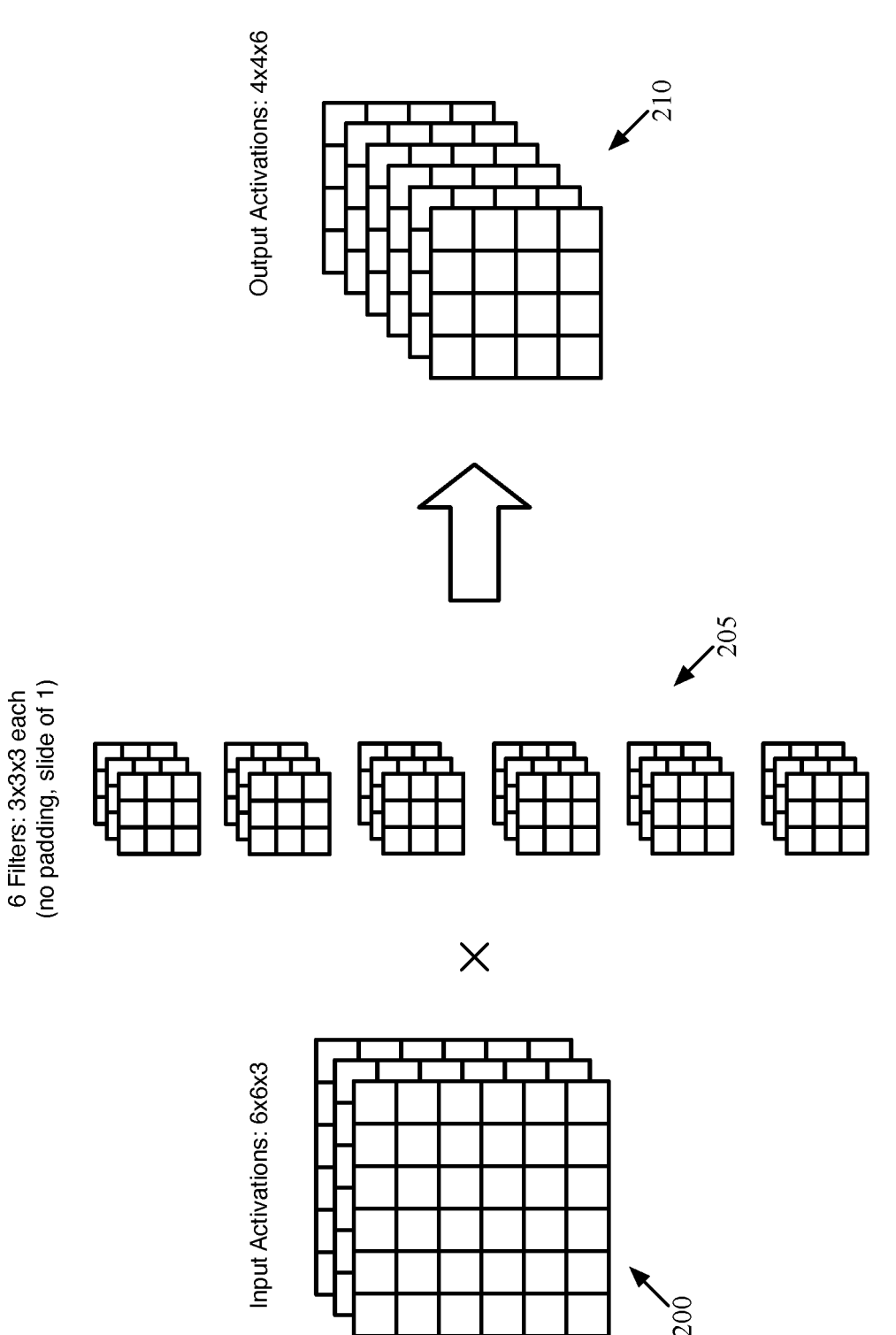
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is typically either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, also referred to as input feature maps or input channels for the layer, as shown in the figure. In this example, the dimensions of the input values are 6×6×3 (i.e., three 6×6 input channels).

Each computation node of the convolutional layer involves a linear component (e.g., a dot product followed by scaling and bias functions) as well as a non-linear component, as further described below. The input to each computation node is a subset of the input activation values, and the dot product for the computation node involves multiplying those input activation values by the weights that make up one of the filters of the layer. As shown, in this example the layer includes six filters 205, each of which is 3×3×3. Each value in one of the filters is a weight value that is trained using the techniques described herein. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three input channels, so the depth is three). The number of filters in a given layer can also vary—as a general concept, each filter is attempting to identify the presence or extent of a particular feature in the input feature maps. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values 200. Specifically, in a typical convolution layer, each 3×3×3 filter is moved across the three-dimensional array of activation values, and the dot product between the 27 activations in the current subset and the 27 weight values in the filter is computed. This process starts in the top left corner (e.g., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids (e.g., to allow for better detection of features at the edges of images).

The output activation values 210 are arranged in a 4×4×6 array in this example. The outputs from a single filter are arranged in a single grid (also referred to as an output feature map or output channel), and because the example has six filters 205, the output activations have six output feature maps. Using a slide value of 1 with no zero-padding results in a 4×4 output feature map for each filter. These output activation values 210 are then the input activation values for the next layer of the neural network.

As shown in FIG. 1, each node in the neural network 100 has a linear component 110 and a nonlinear component 115. The linear component 110 of each hidden or output node in this example computes a dot product of a vector of weight coefficients and a vector of output values of prior nodes (i.e., as described above for convolutional layers), multiplies this by a scaling value (which may be set to 1), and adds an offset. In other words, in a convolutional or fully-connected layer, a node's linear operator computes a scaled weighted sum of its inputs (which are outputs of the previous layer of nodes) plus an offset (also referred to as a bias). Similarly, the linear component 110 of each input node of some embodiments computes a dot product of a vector of weight coefficients and a vector of input values, scales this dot product, and adds an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with l=0 representing the input layer and l=L representing the output layer). The variable $$z_i^{(l+1)}$$

represents the output of the linear component 110 of a hidden node i in layer l+1. As indicated by the following Equation (1), the variable $$z_i^{(l+1)}$$

is computed as the dot product of a vector of weight values $$W_i^{(l+1)}$$

and a vector of outputs $y^{(l)}$ from layer/multiplied by a scaling value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n}\left(w_{ik}^{(l+1)} * y_k^{(l)}\right) * c_i + b_i^{(l+1)}. \tag{1}$$

The scaling value $c_i$ is a value to which all the weight values for the node are normalized. In some embodiments, the scaling value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments require that at least a threshold percentage of the weight values (for a given layer or for the entire network) are equal to zero (e.g., 75%, 80%, etc.).

The output $y^{(l+1)}$ of the nonlinear component 115 of a node in layer l+1 is a function of the node's linear component, and can be expressed as by Equation (2) below:

$$y_i^{(l+1)} = f\left(z_i^{(l+1)}\right). \tag{2}$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions, periodic functions, piecewise linear functions, etc.

Equation (2) can be expressed in the following expanded format of Equation (3):

$$y_i^{(l+1)} = f\left(z_i^{(l+1)}\right) = f\left[\left(\sum\nolimits_{k=1}^{n} w_{ik} * y_k\right) * c_i + b_i^{(l+1)}\right]. \qquad (3)$$

In this equation, $w_{ik}$ are weight values associated with the inputs $y_k$ of the node i in layer l+1.

Before a multi-layer network (e.g., a convolutional neural network) can be used to solve a particular problem, the network is put through a supervised training process that adjusts the network's configurable parameters (e.g., the weight values, biases, etc.). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values). In addition, some embodiments quantize the network (constraining the weight values to sets of allowed values and/or accounting for quantization of output values to a certain number of bits) and use various techniques, such as the alternating direction method of multipliers (ADMM), to train the quantized weight values (which includes performing additional forward and backward propagation) and ensure that at least a threshold percentage of the weight values are set to zero.

In some embodiments, the weight values and/or activation values within the network are quantized for use on a particular device. Specifically, some embodiments quantize activation values to a particular number of bits (e.g., 4 bits) during the execution of the network. For weight values, some embodiments use binary or ternary weight values. Binary weight values are typically trained such that each weight is either 0 or 1, and ternary weight values are typically trained such that each weight value is one of the set {0, 1, −1}. In either case, the weight values may be multiplied by a scale value determined for a layer or channel. To save memory, some embodiments train the networks to be extremely sparse, with a large majority (e.g., 85%, 90%) of the weights set to 0 (rather than 1 or −1). In some such embodiments, the weights are stored on the device (e.g., in the memory of a neural network inference circuit embedded in the device) in an encoded manner such that zero-value weights require less memory than non-zero weights. These networks can still be very predictive, but at the margins decreasing sparsity (e.g., from 90% to 85%) improves prediction accuracy.

Such a neural network inference circuit is part of an integrated circuit (IC) in some embodiments. The ICs of some embodiments are configurable to implement different networks trained to perform a particular function, and such networks may include replicated layers (trained with quantization). For instance, the ICs may implement networks for object or facial recognition in images, voice recognition in audio samples, etc. The IC of some embodiments includes a set of input processing circuits, a neural network computation fabric that can be configured to apply a neural network to an input, and a microprocessor (e.g., for controlling the input processing circuits and configuring the neural network computation fabric). Before describing the techniques of some embodiments used to increase the availability of weight memory on such a neural network inference circuit, such a circuit will be described in greater detail.

Figure 3:
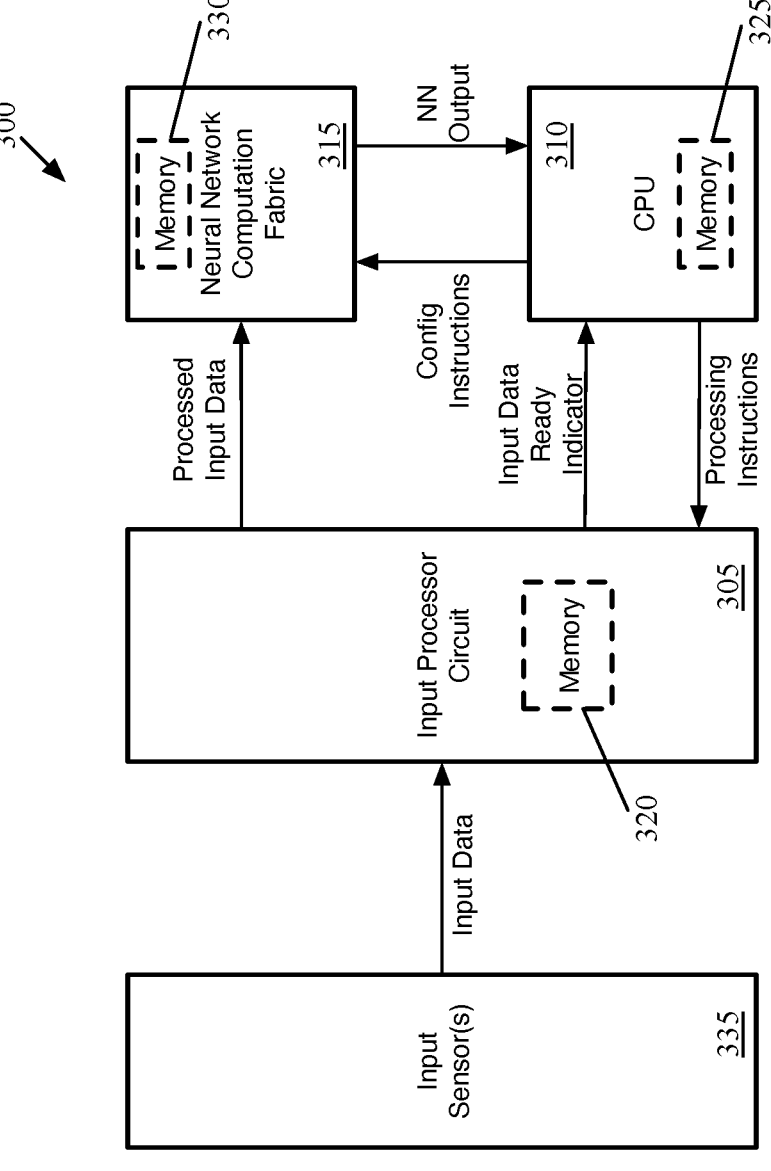
FIG. 3 conceptually illustrates an integrated circuit of some embodiments.

FIG. 3 conceptually illustrates such an IC 300 of some embodiments. As shown, the IC 300 includes an input processor circuit 305, a microprocessor (CPU) 310, and a neural network computation fabric 315. Each of these components 305-315 also has corresponding memory (e.g., random access memory (RAM)) 320-330, although in some embodiments a single unified memory is used to which each of the circuits 305-315 has access. In addition, in some embodiments, the IC is integrated into a device (such as an Internet of Things (IOT) device) with one or more input sensors 335. These input sensors 335 can include cameras (e.g., for capturing video images on which the neural network computation fabric 315 performs face or object recognition, etc.), microphones (e.g., for capturing audio on which the neural network computation fabric 315 performs voice recognition, speech processing, etc.), or other types of input sensors. In other embodiments, the input sensors 335 are located on a separate device that is linked with the IC 300.

In some embodiments, at bootup of the IC 300, the CPU 310 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 315 to write the weight values and other data to its memory 330. In addition, the CPU 310 loads the neural network program instructions for the computation fabric to its own memory 325. These instructions are applied by the computation fabric 315 to input data in order to execute the neural network. These runtime instructions include, e.g., indications as to which pre-loaded sets of instructions to use for each set of calculations, etc. In some embodiments, the runtime instructions specify for the computation fabric 315 to execute a first set of network layers repeatedly on different blocks of input data (to generate blocks of intermediate data) and then execute a second set of network layers on all of the intermediate data together. These instructions, in different embodiments, may specify each pass through the first set of layers as a separate set of layers with separate instructions or may rely on the computation fabric 315 to divide up the input and execute the first set of layers multiple times based on a single set of instructions.

The input processor circuit 305 receives input data (e.g., still images or video frames, sounds, etc.) from the input sensor(s) 335, and processes these according to processing instructions received from the CPU 310. The CPU 310 stores in its memory instructions for the input processor circuit to prepare input data for the computation fabric 315 as well as the neural network program instructions. These instructions identify, in some embodiments, any sort of initial processing to apply to the raw data (e.g., decompression of compressed data, etc.) as well as how to arrange the data to be provided to the computation fabric 315. For an image, e.g., these instructions might specify the order in which the pixels should be arranged and streamed to the computation fabric 315, so that the computation fabric 315 stores this data in the appropriate locations of its memory 330 for subsequent operations. The input processor circuit 305 also sends signals to the CPU 310 to indicate when it has fully buffered an input (e.g., a frame of video) and when the input is prepared to be sent to the computation fabric 315.

In addition to instructing the input processor circuit 305 how and when to provide input data to the computation fabric 315, the CPU 310 provides the neural network program instructions to the computation fabric. In some embodiments the CPU 310 provides these instructions in stages (e.g., one layer or portion of a layer at a time). Once the final output of the neural network is computed, the computation fabric 315 provides this output back to the CPU 310, so that the CPU (or other circuitry on the device) can evaluate this output and perform any actions based on the output.

The computation fabric of some embodiments includes a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero. As described further below, the computation fabric in some embodiments also includes a fixed amount of available memory for weight and activation values.

Figure 4:
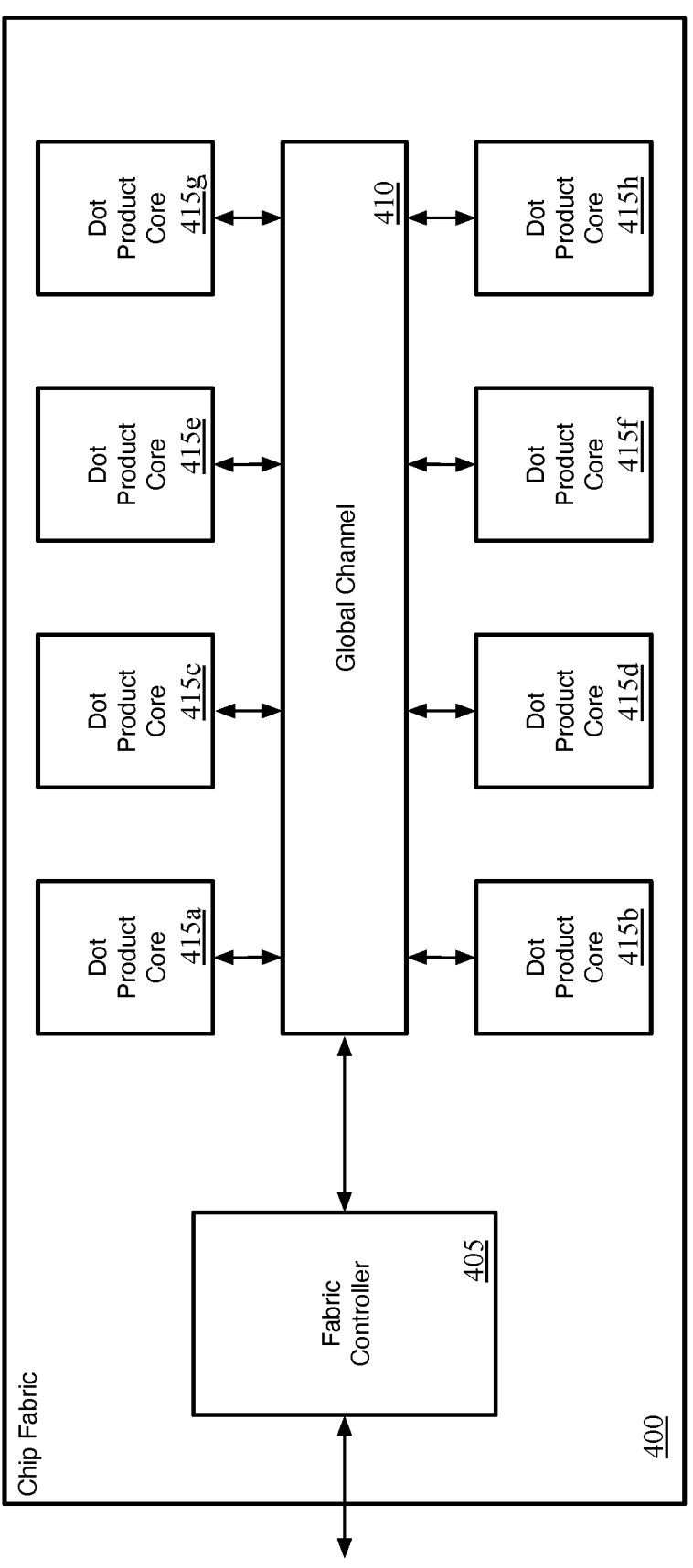
FIG. 4 conceptually illustrates the neural network computation fabric of some embodiments.

FIG. 4 conceptually illustrates the neural network computation fabric 400 (also referred to as the chip fabric) of some embodiments. The chip fabric 400 of some embodiments includes a fabric controller 405, a global channel 410, and a set of dot product cores 415*a-h*. The connections between the various components 405-415 represent the flow of both control data (e.g., configuration data for a particular neural network layer) and computation data at runtime in some embodiments.

The fabric controller 405 is responsible for managing the operation of the rest of the chip fabric 400 (e.g., the dot product cores 415, the global channel 410) in some embodiments. The fabric controller 405 loads instruction arguments (e.g., weight and activation value locations, which cores to use for a particular computation, etc.) from local memory (not shown) on the chip, maps instructions into a sequence of memory-mapped register writes, synchronizes the downstream controllers (e.g., controllers for the various cores 415), etc. The instructions managed by the fabric controller 405 are configured at compile time, in some embodiments, based on the parameters of the network being implemented by the chip fabric 400. As described below, in some embodiments these instructions are generated by a compiler (a software program that generates the configuration data for enabling the IC to execute a particular neural network) to instruct the chip fabric 400 to execute a first set of layers of a network multiple times for separate input blocks, then execute a second set of layers once. In some embodiments, the fabric controller 405 interacts with the microprocessor of the IC as well (i.e., the fabric controller 405 handles the communication with the CPU 310 shown in FIG. 3).

The chip fabric 400 also includes numerous dot product cores 415 as well as a global channel 410 that connects the cores and performs additional neural network processing, with these data processing circuits configured by the fabric controller 405 (and a set of hierarchical control circuits, in some embodiments). These data processing circuits 410 and 415 operate to compute neural network operations in an efficient, low-power manner, according to the configuration data provided by the control circuits.

The dot product cores 415*a-h* include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs.

The global channel 410 is responsible for providing a communications bus for control and computation data between the fabric controller 405 and the cores 415, as well as from one core to another. The global channel 410, among other operations, accumulates partial dot products from multiple cores when computing dot products that require more computations than can be performed in a single core, and performs post-processing on these dot products. In addition, the global channel 410 carries activations (i.e., computation node outputs) after post-processing for storage (and for use as inputs to subsequent computation nodes) in other cores 415. In some embodiments, the global channel 410 includes an accumulating bus for accumulating the dot products and a non-computation bus for providing activations, weights, and other configuration data to the cores and other computation circuits. In some embodiments, the linear function post-processing (e.g., bias and scale) and non-linear function for each neural network node are also performed by circuits in the global channel 410, as described further below.

The chip fabric 400 of some embodiments computes numerous neural network computation nodes simultaneously, with the computation for one node often spread across multiple cores (and subsequently the global channel). In some cases, if a neural network layer is small enough, then computation for that layer may be confined to a single core 415. However, if multiple cores are used for a given layer (any number of cores may be used in some embodiments), then each dot product computed for that layer is spread across all of the cores 415 in use.

That is, for a dot product computed across more than one core 415, each of these cores computes a partial dot product from a subset of the input values and weight values for the node, then provides these partial dot products to the global channel 410. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments when executing a layer of a network the cores load sets of weight values once and then compute dot products of these weight values with numerous different sets of input values.

In the simplest case, all of the partial dot products are computed in the same clock cycle and provided at the same time to the global channel 410. In some cases, however (e.g., for dot products with a very large number of terms or using larger than standard activation values, or when filters have too many nonzero weight values), each core 415 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 410 aggregates these partial dot products to compute the complete dot product for each node, then applies various post-processing functions (e.g., the bias, scale, and non-linear activation functions) to compute the output of each node.

In some embodiments, the dot product cores are grouped into clusters, and the global channel includes separate segments for each such cluster. Each of these channel segments includes the same circuitry in some embodiments, with the exception that buses in the first and last channel segments only connect to corresponding buses in one other channel segment while the buses in the middle channel segments connect to corresponding buses in two neighboring channel segments.

The data processing circuitry of each of the channel segments includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits is the computation node outputs (activations). The output bus, or activation write bus, carries the outputs of the post-processing circuits to the cores to be stored as inputs for the next computation layer.

Figure 5:
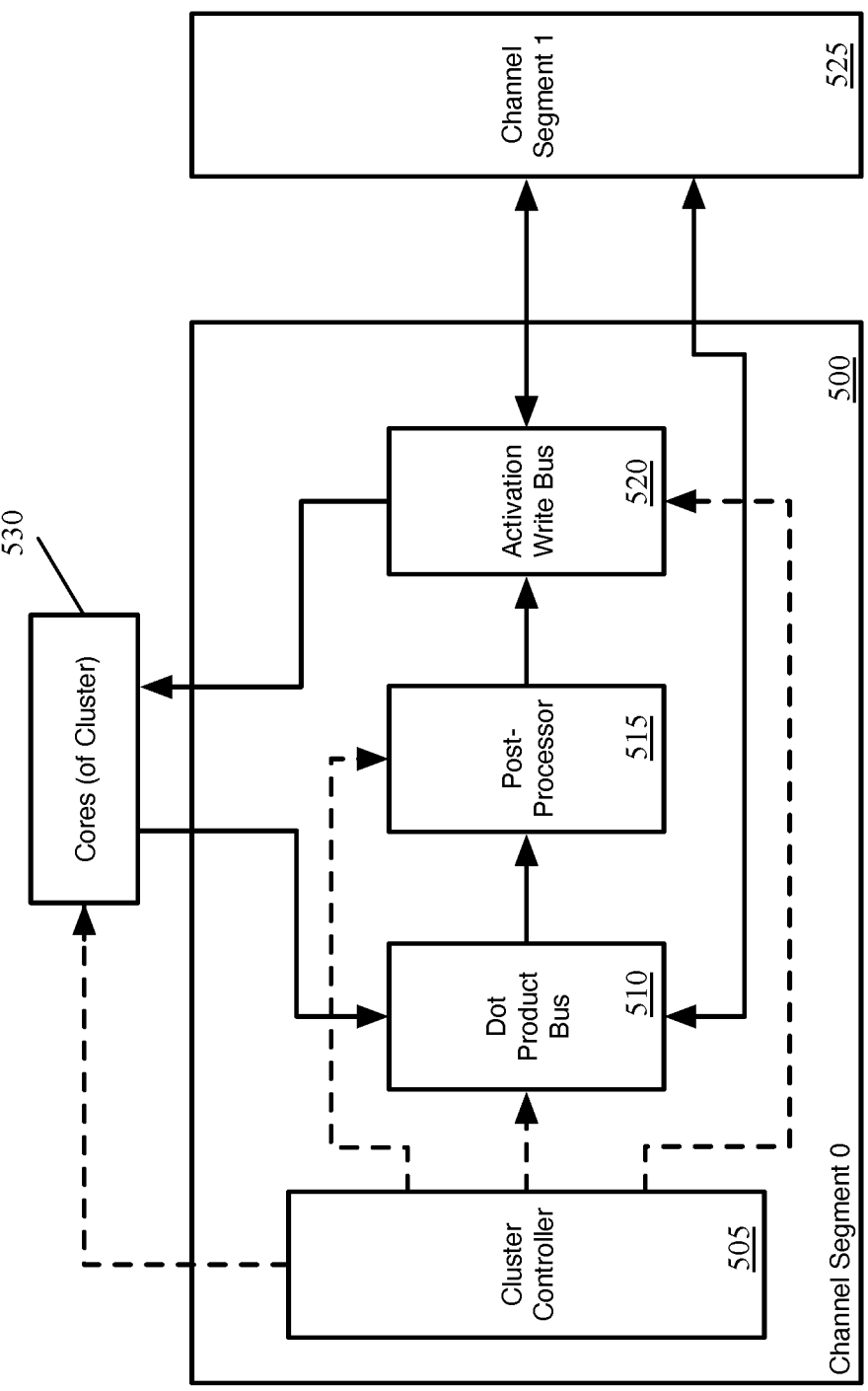
FIG. 5 conceptually illustrates the circuit blocks of a channel segment of some embodiments.

FIG. 5 conceptually illustrates the circuit blocks of a channel segment 500 of some embodiments. The channel segment 500 includes a cluster controller 505, a dot product bus 510, a post-processor 515, and an activation write bus 520 (also referred to as an output bus). In addition to the channel segment 500, the figure also illustrates an additional channel segment 525 and the cores 530 of the local cluster for the channel segment 500, as the circuit blocks of the channel segment 500 exchange dot product, computed activation, and configuration data with these other circuits. In this diagram, the dashed lines represent the flow of configuration data while the solid lines represent the flow of neural network computation node data (e.g., for convolution or fully-connected layer nodes that use a dot product based linear function). Additional neural network computation data, such as that flowing directly from the cores 530 to the post-processor 515 for pooling nodes or element-wise operators, is not shown.

The cluster controller 505 configures the dot product bus 510, post-processor 515, and activation write bus 520 as per the configuration instructions received from the fabric controller in some embodiments. For the dot product bus 510, this configuration data specifies, in some embodiments, (i) which partial dot products are to be added together as part of the same neural network computation node and (ii) to which post-processing unit each aggregated dot product is sent (the post-processor 515 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 515, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table or a piecewise linear function), as well as other data. For the activation write bus 520, the configuration data indicates to which cores each output value is to be delivered, in some embodiments.

As mentioned, the solid lines indicate the flow of neural network computation data, for a node in a convolutional or fully-connected layer. The cores 530 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 510, which aggregates the partial dot products from the cores 530 of the local cluster. The dot product bus 510, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index N in the cores), (ii) one of the post-processing units in each of the clusters (i.e., dot product bus lane N provides its aggregated output to the post-processing unit N in one of the clusters, as specified by the configuration data), and (iii) one lane of the activation write bus.

Each lane of the dot product bus 510 spans all of the channel segments, and the dot product bus lanes in each channel segment aggregate the partial dot products from the cores of its local cluster. The dot product bus 510 in the channel segment 500 also exchanges locally-aggregated dot products with its neighboring segments for further aggregation if needed (i.e., if the source cores for the dot product computation span multiple clusters). In this case, the channel segment 500 only has one neighboring segment, but internal channel segments will have two such neighboring segments. The configuration data from the cluster controller 505 specifies whether to send these dot products in one direction or the other along the global channel for each dot product bus lane, or to aggregate the dot products from the neighboring channels locally, depending on where post-processing will occur for each dot product.

The post-processor 515 includes numerous post-processing units that receive the dot products from their corresponding dot product bus lane and perform the non-dot product functions of the neural network computation nodes. For a typical computation node of a convolutional (or fully-connected) layer, these functions include an addition operation to account for the bias factor and/or a shift related to batch normalization, a multiplication operation to account for the weight scaling factor and/or a scaling factor related to batch normalization, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table or a piecewise linear function (specified by configuration data) rather than a hardwired function. This enables the IC to execute different neural networks that use different activation functions and, in some embodiments, allows for different activation functions to be used in different layers of the neural network.

The activation write bus 520 receives the computation node activation outputs from the post-processing units and carries these outputs back to the cores 530, to be stored in the memory of the core and used as inputs for the computation nodes of the next layer of the neural network. The activation write bus 520 connects to the cores 530 in the local cluster as well as the activation write bus in the neighboring channel segment 525. As with the dot product bus 510, the activation write bus 520 of some embodiments includes individual lanes, with each post-processing unit of the post-processor 515 sending its output to a different one of these lanes.

In some embodiments, the output values may be computed by the post-processor 515 in one cluster but carried by the activation write bus 520 to a core in another cluster to be stored. For efficiency, the compiler of some embodiments attempts to optimize the location of the post-processing unit for each computation node output relative to the cores used to compute the constituent partial dot products for that computation node and the destination core for the output value. The activation write bus 520 also includes a right shift circuit for each core that is used to align the output values for the core, in order for the values to be stored in contiguous blocks within the core RAM.

Figure 6:
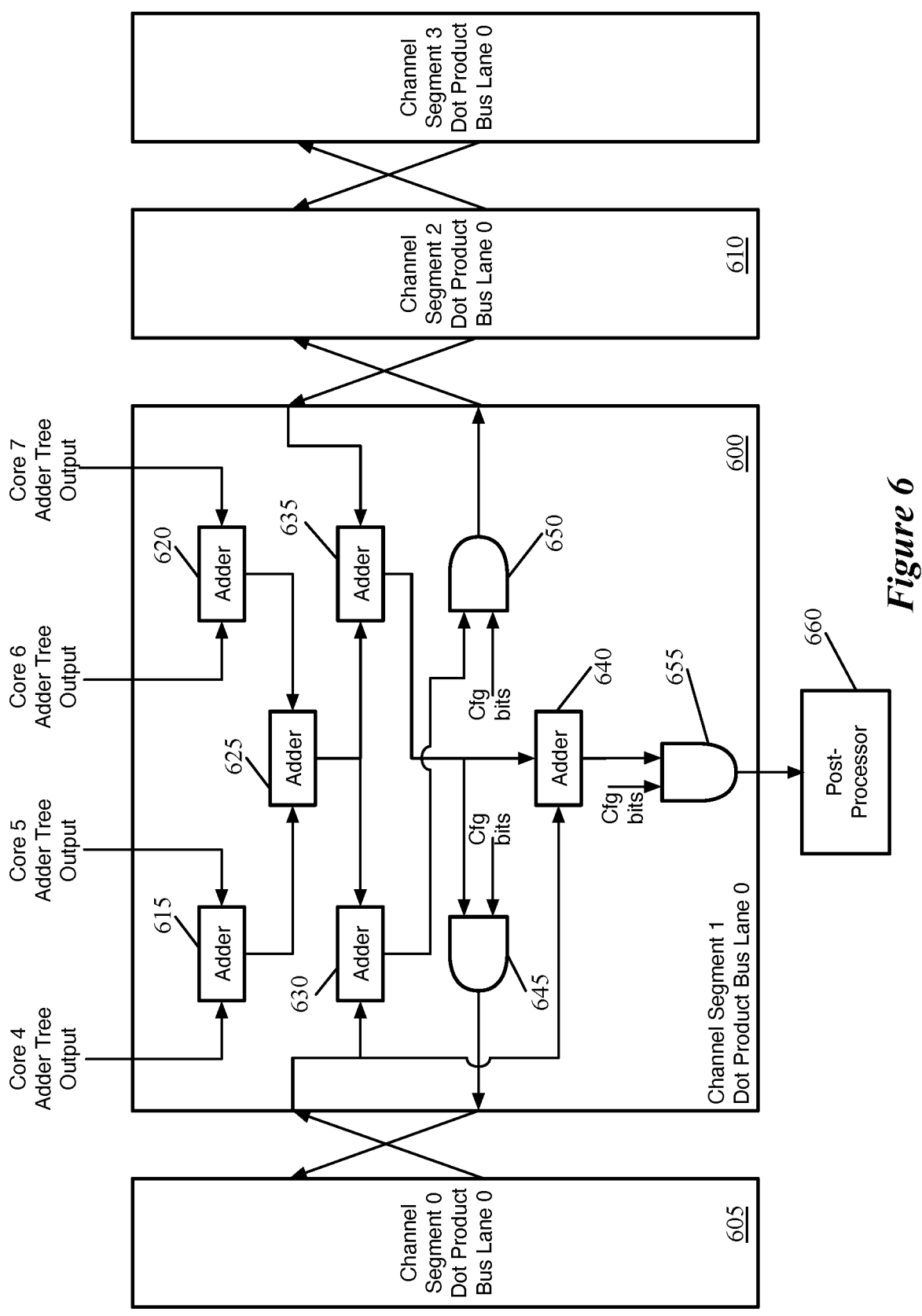
FIG. 6 conceptually illustrates a portion of a dot product bus of some embodiments.

Now that the primary circuit blocks of the global channel have been introduced, some of these circuits of some embodiments will be explained in greater detail. FIG. 6 conceptually illustrates a portion 600 of a dot product bus of some embodiments. In this example, the segment for which the dot product bus portion 600 is shown is an internal segment (in that it has two neighboring segments 605 and 610). The dot product bus of some embodiments includes, within each segment, numerous (N) non-interacting lanes, and the portion 600 is a segment of one of these lanes. In some embodiments, each segment includes the same number of lanes, and lane n∈N in one segment is connected to lane n in its neighboring segments for the aggregation of dot products across clusters. In some embodiments, the number N of dot product bus lanes is equal to the number of adder trees computing partial dot products in each core, the number of post-processing units in each post-processor block of a channel segment, and the number of activation write bus lanes. Thus, each computation node has its partial dot product computed by the same adder tree in each of one or more cores, which is aggregated across the corresponding dot product bus lane to calculate the complete dot product. This complete dot product is (in the typical case) provided to the corresponding post-processing unit, which provides its output to the corresponding activation write bus lane to be carried to the appropriate core.

The dot product bus portion 600 includes a set of adders 615-640 as well as a set of AND gates 645-655. The first three adders 615-625 form an adder tree to aggregate the partial dot products output by the corresponding adder trees of the four cores of the local cluster for the channel segment. In some embodiments, if a core does not compute a partial dot product for a particular computation node, then that core outputs a 0 value to the dot product bus. This aggregated partial dot product is output to both of the adders 630 and 635.

These adders 630 and 635 handle the computation of dot products that are "moving" downstream (to a lower-numbered segment, in this case segment 605) and upstream (to a higher-numbered segment, in this case segment 610). The adder 630 receives the aggregated dot product from the corresponding downstream dot product bus lane 605 and combines it with the locally aggregated dot product from the adder 625. If either (i) the cores of the downstream cluster(s) do not participate in the dot product computation or (ii) the dot product will be completely aggregated and sent to a post-processor downstream, then this value received from the downstream dot product bus lane 605 is gated to 0 (i.e., by the equivalent of AND gate 650 in the downstream segment).

Correspondingly, the adder 635 receives the aggregated dot product from the corresponding upstream dot product bus lane 610 and combines it with the locally aggregated dot product from the adder 625. If either (i) the cores of the upstream cluster(s) do not participate in the dot product computation or (ii) the dot product will be completely aggregated and sent to a post-processor upstream, then this value received from the upstream dot product bus lane 610 is gated to 0 (i.e., by the equivalent of AND gate 645 in the upstream segment).

The output of the adder 630 is sent to the AND gate 650, which ANDs this output with configuration bits from the local cluster controller based on where the post-processing for the completed dot product will be performed. If the post-processing segment is upstream, then these configuration bits are 1 (resulting in the aggregated dot product being passed upstream), whereas if the post-processing segment is either downstream or local, then these configuration bits are 0 (resulting in 0 values being passed upstream).

Similarly, the output of the adder 635 is sent to the AND gate 645, which ANDs this output with configuration bits from the local cluster controller based on where the post-processing for the completed dot product will be performed. If the post-processing segment is downstream, then these configuration bits are 1 (resulting in the aggregated dot product being passed downstream), whereas if the post-processing segment is either upstream or local, then these configuration bits are 0 (resulting in 0 values being passed downstream).

The final adder 640 receives (i) the output of the adder 635 and (ii) the aggregated dot product from the downstream segment 605 of the dot product bus lane. It should be noted that the directions could be reversed in other embodiments with an equivalent effect, with this adder 640 instead receiving the output of the adder 630 and the aggregated dot product from the upstream segment 610 of the dot product bus lane. This adder aggregates the complete dot product (accounting for the partial dot products from the local cores and upstream cores via the output of adder 635 and the partial dot products from the downstream cores via the output from the segment 605).

The output of the final adder 640 is provided to the post-processor 660 (e.g., to the post-processing unit that corresponds to the lane of the dot product bus). However, AND gate 655 is used to gate this output to 0 if the post-processor for this dot product bus lane is not local (i.e., either upstream or downstream). In summary, the dot product bus lane segment 600 is configured (via the AND gates 645-655) to (i) add the local cluster partial product with the downstream partial product and pass this aggregated partial product upstream if the post-processing segment is upstream, (ii) add the local cluster partial product with the upstream partial product and pass this aggregated partial product downstream if the post-processing segment is downstream, and (iii) add the local cluster partial product with the downstream and upstream partial products and pass this completed dot product to the local post-processor if the post-processing will be performed locally. In some embodiments, the post-processing segment is selected by the compiler, with the primary factor in this selection being that the post-processing segment is centrally located among the source clusters (i.e., the cores that compute the partial dot products) and a secondary factor being that the selected segment is as close to the destination core(s) as possible, in order to reduce the power required for the computation and write operations.

In addition to the circuitry shown in FIG. 6, the dot product bus also includes a control block in some embodiments. This block is responsible for outputting a signal to the post-processor block to indicate when the output of the dot product bus is valid (i.e., when the dot products are aggregated by the dot product bus), so that the post-processor acts on the data from the dot product bus.

Figure 7:
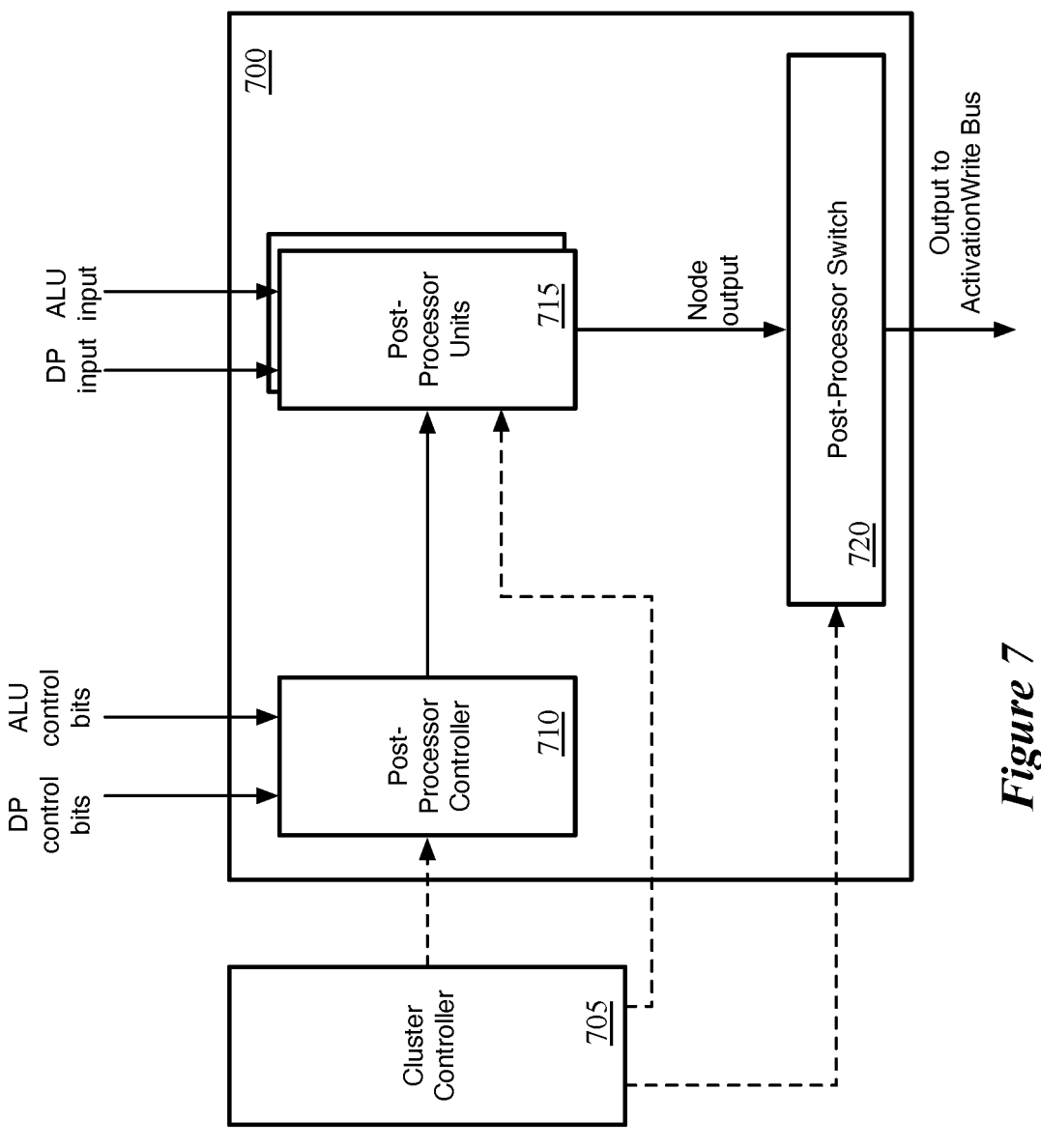
FIG. 7 conceptually illustrates the post-processing circuit block for a channel segment of some embodiments, along with the local cluster controller that provides configuration data to this post-processor.

FIG. 7 conceptually illustrates the post-processing circuit block 700 for a channel segment of some embodiments, along with the local cluster controller 705 that provides configuration data to this post-processor 700. As shown, the post-processing circuit block 700 includes as sub-blocks a post-processor controller 710, a set of post-processing units 715, and a post-processor switch 720. The cluster controller 705 provides configuration data to each of these sub-blocks in order to synchronize operations, and to configure the post-processing units 715 with the correct bias and scale factors as well as the activation function.

The post-processor controller block 710 aggregates control signals from the dot product bus (e.g., for convolution and fully-connected layers) as well as an ALU bus that carries activation values directly from the cores (e.g., for pooling, copy, and element-wise layers). These control bits include accumulate and valid signals for the dot product bus (which indicate to the post-processor whether the incoming data is a final dot product, as dot products are not sent every clock cycle of the chip fabric) as well as accumulate, valid, and end of row signals for the ALU bus. The ALU bus carries activation values directly from the cores without having dot products performed, to be used for pooling and element-wise operation layers. The accumulate and valid signals indicate to the post-processor whether the incoming ALU data is to be used, while the end of row signals indicate that different configuration data should be used for certain post-processing operations when the end of a row of input values is reached (e.g., on account of padding, etc.). The post-processor controller block 710 aggregates these signals, as mentioned, and outputs signals to the post-processing units 715 to indicate when the post-processing units are receiving valid dot product or ALU data.

The post-processor 700 includes numerous post-processing units 715 that handle the non-dot product computation of the neural network nodes. In some embodiments, the post-processor block within a segment includes the same number of post-processing units 715 as there are dot product bus lanes and activation write bus lanes (which is also the number of adder trees in each core for computing partial dot products). Each post-processing unit 715 receives two types of data inputs: (1) dot products from the dot product bus for convolution and fully-connected neural network nodes and (2) activation inputs (ALU inputs) from the core RAM for pooling nodes and element-wise operator nodes.

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). Some of the details of the post-processing units are described further below by reference to FIG. 8.

The post-processing switch 720 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing two 4-bit activation outputs onto the wires for one 8-bit activation output).

Figure 8:
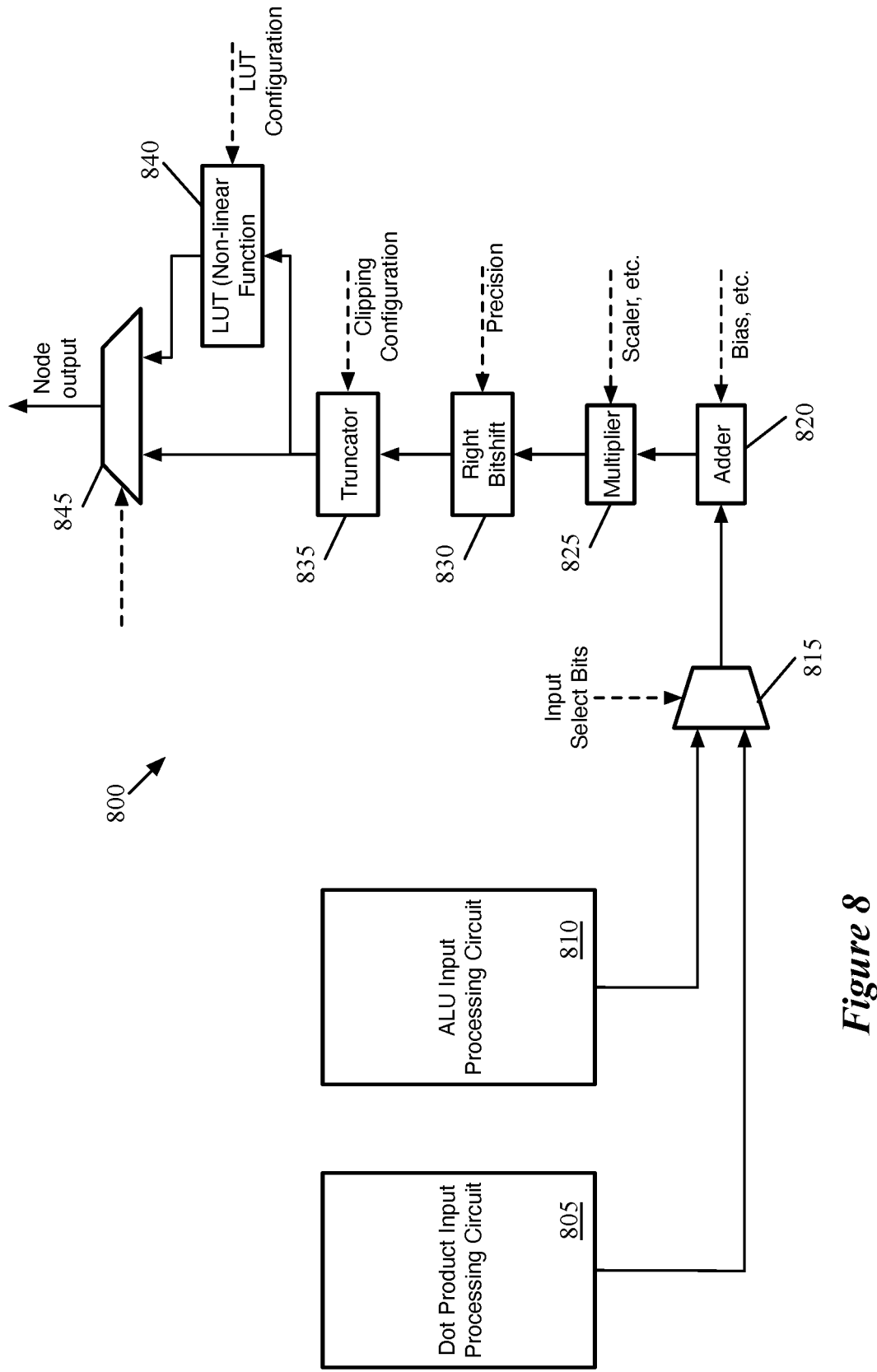
FIG. 8 conceptually illustrates the structure of a post-processing unit of some embodiments.

FIG. 8 conceptually illustrates the structure of a post-processing unit 800 of some embodiments. As shown, the post-processing unit 800 includes a dot product input processing circuit 805, an ALU input processing circuit 810, a multiplexer 815 that selects between the outputs of these two circuits, and a set of post-processing operation circuits.

The dot product input processing circuit 805 is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bit shifting the first set of input data.

The ALU input processing circuit 810 is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations (e.g., element-wise addition or multiplication layers). In some of these embodiments, the cores provide input values directly to the post-processing units without computing dot products, and the post-processing units are configured to perform the appropriate operations on these inputs.

The output of each of these circuits 805 and 810 is sent to a multiplexer 815, and a set of configuration bits is used to select between these two possible inputs. This input value is sent to an adder 820 and then to a multiplier 825. For dot product outputs, the adder 820 adds the bias of the linear function for the node and the multiplier 825 multiplies this by the scaling factor for the linear function (these bias and scale factors may also include batch normalization affine transform parameters, in some embodiments). The value sent to the multiplier 825, in some embodiments, is a combination of (i) an affine transform scaling value computed during the training of the neural network and (ii) the positive value of the ternary weights (which was removed in order to scale the weight values used in the dot product to 1 and −1).

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and typical element-wise operator layers may use the same value for all of the nodes (often zero).

For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 830 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions. This bit shift circuit 830 can be used to modify the precision of replica layers in some embodiments, as described below.

The truncator 835 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 835 receives (as output from the right bit shifter 830) more bits than it outputs (e.g., receiving 32 bits but outputting a maximum of 16 bits).

Finally, the LUT 840 implements the non-linear activation function. The full (e.g., 16-bit, 8-bit) output of the truncator 835 is passed to the multiplexer 845, while a subset of the output bits (e.g., 5 bits) are also split off to the LUT 845. This LUT effectively implements a mapping table representing the activation function for the neural network computation node, and the multiplexer 845 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function. In some embodiments, periodic functions can be implemented using the modulus function of the truncator 835. In this case, the period of the period function is the full truth table provided to the lookup table 840, with the modulus function meaning that only the 5 least significant bits of the output from the right bit shifter 830 will affect the value output by the lookup table 840. Rather than a LUT, some embodiments configure a piecewise linear function as the activation function. The piecewise linear function can be configured based on defining slopes and/or y-intercepts of the different segments of the function, in some embodiments.

Figure 9:
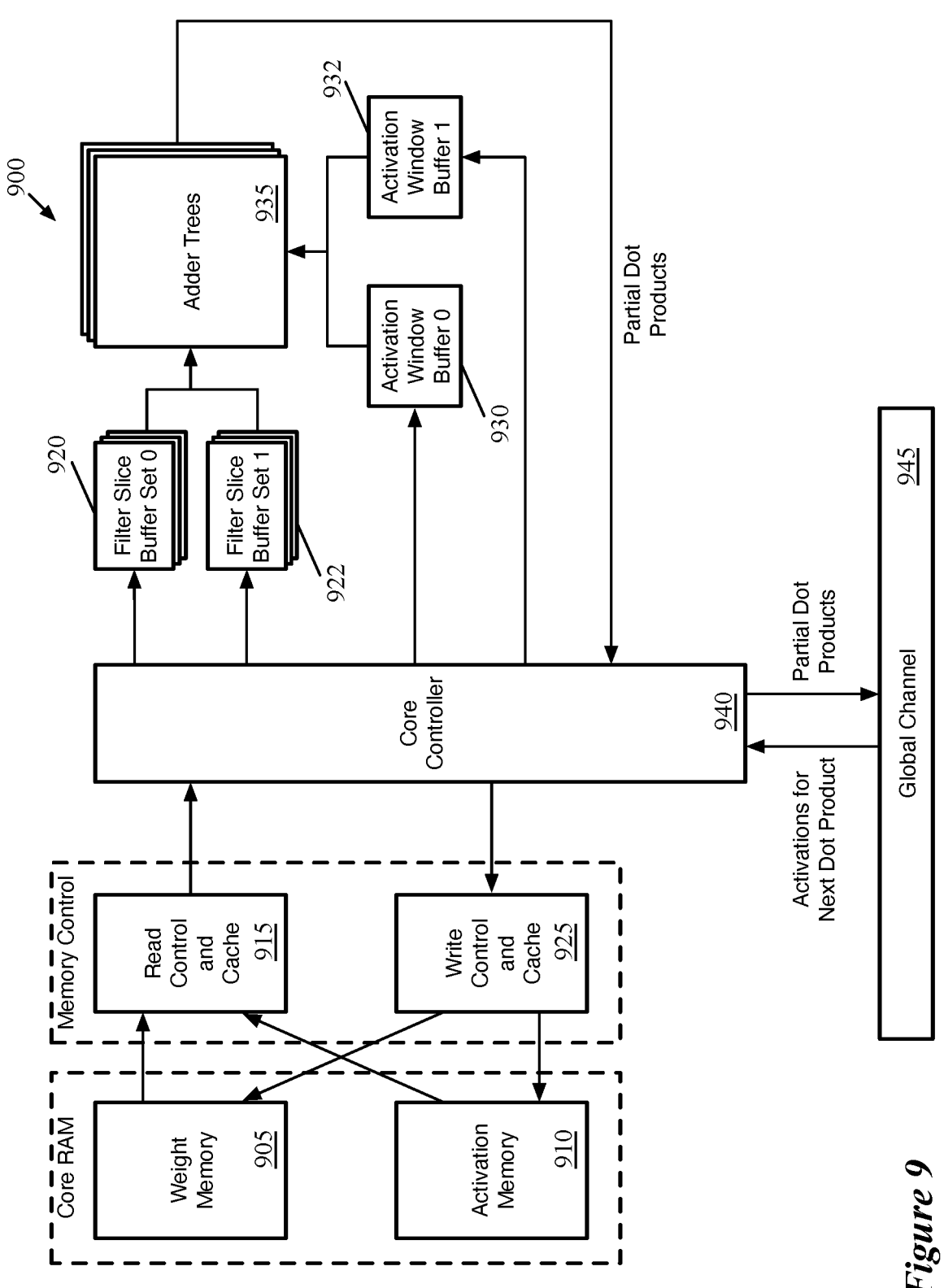
FIG. 9 conceptually illustrates the data flow within one of the cores of some embodiments for a dot product computation.

As mentioned, the dot product cores perform the majority of the dot product computation of the chip fabric of some embodiments. FIG. 9 conceptually illustrates the data flow 900 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different numbers of bits for weight data and/or activation values, different numbers of adder trees within a core, etc.

In some embodiments, the dot product cores store weight data values (e.g., weights for multiple nodes in multiple layers) in the weight memory 905 and activation values in the activation memory 910. In some embodiments, as shown, these memories 905 and 910 are part of a single block of memory for the core (e.g., banks of random access memories such as SRAMs) or even a single block of memory used by all of the cores with separate blocks allocated to different cores. In addition to storing weight and activation values, in some embodiments the same memory is used by the microprocessor of the IC as part of a unified memory (e.g., to store an image before the image is processed and provided as input to the neural network fabric). The manner in which the weight data and activation values are stored in these memories according to some embodiments is described in detail below by reference to FIGS. 13-15 and 16-17.

The weight values are part of the network parameters and thus are determined through training and included in the network instructions generated by the compiler (and do not change at runtime), while the activation values (the input values to a particular node or set of nodes being computed) are the output values from a previous computation (or, for the first layer, are otherwise based on the network input) and thus are determined at runtime. Thus, the weight memory 905 is often larger than the activation memory 910, as the activation memory is at least partly overwritten for each new layer of the neural network while the weight memory 905 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/–1). In other embodiments, the weights are encoded in such a manner that less than 1 bit of the weight memory 905 is allocated per weight value (e.g., by encoding the weight values in such a way that many of the zeros are removed, while storing additional data for each non-zero weight value).

The read controller and read cache 915 reads data from the weight memory 905 into sets of filter slice buffers 920 and 922 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute 144 dot product components (with the requirement that at least 75% of the weight values be zero, the actual adder tree only receives 36-40 inputs for each buffer of 144 activation values, as described in detail below). As noted above, the numbers given in this description are meant as examples, and different numbers of inputs are used in different embodiments.

Some embodiments include both primary filter slice buffers 920 and secondary filter slice buffers 922, as shown in this figure. In a given clock cycle, at most one of these sets of filter slice buffers is used to compute dot products (e.g., using multiplexers to select only one of the sets of weight value data). For simpler dot product computations, only the primary filter slice buffer 920 is needed, so there is no need to load weight values into the secondary filter slice buffers 922. However, in other cases, both sets of filter slice buffers may be used (e.g., when dot products are too large to be computed in a single clock cycle using only the primary buffers).

The read control and cache 915 also reads data (input values) from the activation memory 910 into the activation window buffers 930 and 932. In addition, the read controller 915 arranges the input values within the activation window buffers 930 and 932 in some embodiments to match up with the weight values in the filters. In some embodiments, the input values in an activation window read into the buffers 930 (and 932) include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 930 and a secondary activation window buffer 932. In a given clock cycle, at most one of these sets of activation window buffers is used to compute dot products (e.g., using multiplexers to select only one of the sets of activation input values). For simpler dot product computations, only the primary activation window buffer 930 is needed, so there is no need to load activation inputs into the secondary activation window buffer 932. However, in other cases, both activation window buffers may be used (e.g., when dot products are too large to be computed in a single clock cycle using only the primary buffers). In some embodiments, as shown, the same read controller and cache 915 is used to read data from both the weight memory partition 905 and the activation memory partition 910. In such embodiments, the cache is used to store weight value data when reading the weights from the weight memory 905. For each pass, this memory control circuit first reads the encoded weight data and provides this data to the core controller 940 (which decodes weight data and loads the decoded weight data into the filter slice buffers), then reads input values and provides these values to the core controller 940 (for the core controller to load the input values into the activation window buffer(s) interspersed with the computation of dot products by the adder tree circuits 935).

The adder trees 935 compute the dot products between the weight values represented in the filter slice buffers 920 and the input values in the activation window buffer 930. The details of these partial dot product computation circuits of some embodiments are described below by reference to FIGS. 10 and 11. These adder trees 935 output partial dot products (e.g., 10-bit values) that are provided to the dot product bus, which combines the partial dot products with other partial dot products as described above. In some embodiments, the number of filter slice buffers in each of the sets 920 and 922 is equal to the number of adder trees 935 in the core, as well as the number of dot product bus lanes, post-processing units, and activation write bus lanes in each segment. Thus, for a typical neural network computation node, the partial dot products computed by the adder trees 935 in multiple cores having a particular index are aggregated by the dot product bus lane with the same index, that aggregated dot product is provided for post-processing to one of the post-processing units with the same index (i.e., the post-processing unit with that index in one of the channel segments), and the output of the post-processing unit is transported by the activation write bus with the same index) to its destination core.

The core controller 940 configures and coordinates the operation of the read and write controllers 915 and 925 in addition to the filter slice buffers 920, activation window buffer 930, and adder trees 935. Furthermore, the core controller 940 receives the input activations and weights from the read controller 915 and loads them into the correct slots in the sets of filter slice buffers 920 and 922 and the activation window buffers 930 and 932 (or directs them to the ALU bus for non-dot product computations). Lastly, when the adder trees 935 output their partial dot product values, the core controller 940 sends these values to the dot product bus in the global channel 945. When the activations for the next layer are output, the activation write bus carries these values to the core controller 940, which provides them to the write control and cache 925 to be written to activation memory 910.

To reduce the circuit area and power required for dot product computations (which use the majority of resources for neural network inference), the partial dot product computation circuits (e.g., the adder trees 935) of some embodiments map each of a first number of input values to a second number (e.g., 25% of the first number) of dot product inputs, such that each dot product input only receives at most one input value with a non-zero corresponding weight value.

Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of 75% or greater weight sparsity (i.e., at least 75% of the weight values for any set of input values are zero), e.g., due to training using quantization and sparsification techniques described above, the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 10:
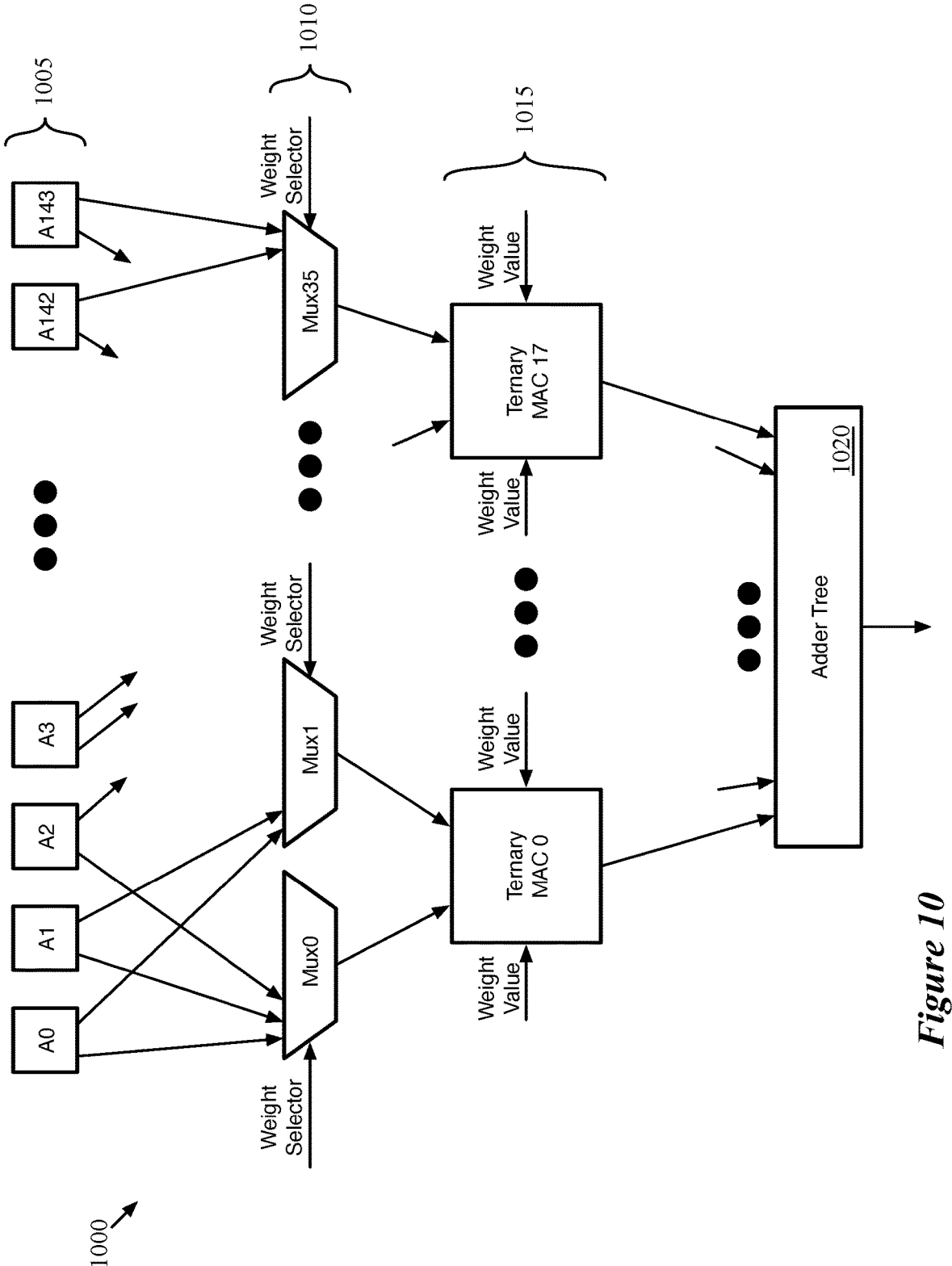
FIG. 10 conceptually illustrates an example of a partial dot product computation circuit for a guaranteed weight sparsity of at least 75%.

FIG. 10 conceptually illustrates an example of such a partial dot product computation circuit 1000 for a weight sparsity of at least 75%. The wiring of the input values for this dot product computation circuit is designed to optimize the likelihood that, so long as the weights meet the sparsity requirement, the compiler can ensure that at runtime each input value with a nonzero corresponding weight value is provided to a different dot product input for nearly any arrangement of the nonzero weight values. As shown, the dot product computation circuit 1000 includes a set of activation inputs 1005, a set of multiplexers 1010, a set of ternary multiplier-accumulator (MAC) circuits 1015, and an adder tree 1020.

In this example, the dot product computation circuit 1000 includes 144 input activation values 1005. In different embodiments, the activation window buffer may have different sizes (e.g., 128 input activation values), which defines the size of the partial dot product computation. Each input value storage (e.g., each location in the activation window buffer) is connected to two of the thirty-six multiplexers 1010. In this example, at least 75% sparsity is assumed for each set of weight values, and thus the 144 activation inputs can be reduced to 36 inputs for the actual dot product computation. This significantly reduces the circuit area required for the dot product computation, as the number of adders is reduced by 75% (the adder tree effectively starts with 36 values rather than 144 values), in addition to reducing the amount of weight data that is stored in memory.

The multiplexers 1010 each have eight inputs and receive a set of select bits (the weight selector input) from the core controller that specifies which of these eight inputs to pass to the dot product computation. In some embodiments the weight selector input is a 3-bit value that is stored as part of the weight data for each non-zero weight. Having thirty-six 8-input multiplexers 1010 allows for 288 sets of wires from the activation inputs 1005 to the multiplexers 1010, which is two wires for each activation input. If the sparsity target was only 50%, then seventy-two 4-input multiplexers could be used with two sets of wires for each activation input 1005 (or seventy-two 8-input multiplexers with four sets of wires for each activation input 1005), with similar proportions for different sparsity targets and numbers of wires per activation input.

The wire sets from the activation inputs to the multiplexers are arranged such that the compiler can verify that each input value with a nonzero corresponding weight is provided to a different one of the multiplexers 1010. The weight values are not known at the time of IC manufacture, and thus the wiring design is resilient to different arrangements of the nonzero weight values (that meet the sparsity requirement).

Some embodiments use a cuckoo hashing algorithm (or other algorithm) to optimally map the wire sets from the activation inputs 1005 to the multiplexers 1010. In some embodiments, this algorithm computes two hashes (e.g., with two different hash functions) for each of the activation input locations 1005 that map to two different multiplexers 1010 (e.g., by computing the hash modulo 36). Each activation input location 1005 is wired to these two different multiplexers 1010 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 1010 are determined by which of the inputs to the multiplexer carries an input activation value with a nonzero corresponding weight value, and are received from the filter slice buffer. In some embodiments, these multiplexer select bits are stored for each non-zero weight value (for multiplexers that do not receive any inputs corresponding to non-zero weights, the multiplexer select bits do not matter, and thus do not need to be stored in the encoded weight data). These multiplexers 1010 provide their output to a set of ternary multiply-accumulator (MAC) circuits 1015. The ternary MAC circuits effectively form the leaves of the dot product computation, and the number of such circuits is half the number of multiplexers 1010 (18 ternary MAC circuits 1015 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 1015 add the two input values from the multiplexers 1010 while also receiving as inputs the corresponding weight data for these input values. In some embodiments, the ternary MAC receives two bits of weight data for each of its inputs. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value. The negative values are accounted for in the bias computation within the post-processing unit, as described above.

The outputs of the ternary MACs provide the inputs to the adder tree 1020 that computes the output for the partial dot product computation. In some embodiments, this adder tree is a standard adder tree circuit that adds pairs of values over several layers. For example, the adder tree 1020 receives 18 inputs for 9 adders, which in turn provide outputs to 4 adders (with an additional output to be added in later), etc. In some embodiments, the inputs to the ternary MACs 1015 are 4-bit inputs (the length of the quantized activation values), and the ternary MACs 1015 output 6-bit values. The adder tree 1020 receives these 6-bit values and outputs a 10-bit value after several stages of addition. It should be noted that this description refers to handling of signed 4-bit input values. Some embodiments can also handle unsigned input values by converting them to signed input values before performing the addition operations. For example, some embodiments output and store 4-bit outputs, which can be signed or unsigned. Before performing the addition operations, an additional bit is added that either sign-extends (to convert signed 4-bit inputs to signed 5-bit inputs) or 0-pads (to convert unsigned 4-bit inputs to signed 5-bit inputs).

While this diagram shows the wires (or some of the wires) connecting each of the input values 1005 to a single partial dot product computation circuit, in some embodiments each of these input values 1005 in the activation window buffer is actually connected to each of the partial dot product computation circuits in the core. That is, for the case with 64 such circuits, each value in the activation window buffer is carried by 128 total wires to 128 multiplexers (two for each of the partial dot product computation circuits). In some embodiments, the wiring arrangement is the same for each set of multiplexers (i.e., for each partial dot product computation circuit).

Figure 11:
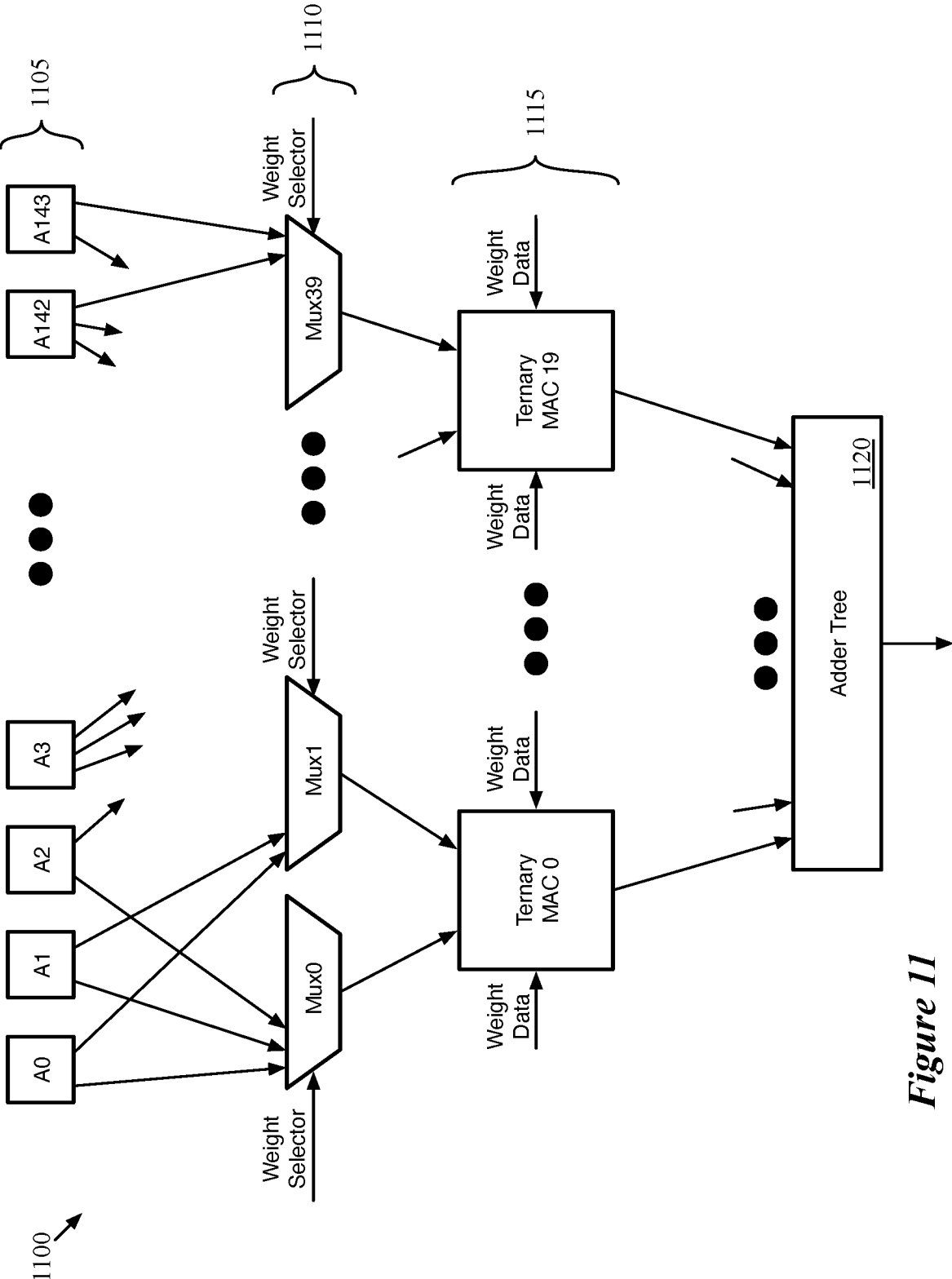
FIG. 11 illustrates a partial dot product computation circuit 1100 of some embodiments with redundant multiplexer inputs.

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. FIG. 11 illustrates a partial dot product computation circuit 1100 of some embodiments with redundant multiplexer inputs. The partial dot product computation circuit 1100 is structured in the same manner as the circuit 1000, and includes 144 activation inputs 1105, a set of forty multiplexers 1110, a set of twenty ternary MAC circuits 1115, and an adder tree 1120.

The difference between the circuit 1000 of FIG. 10 and the circuit 1100 is that the latter includes additional multiplexers 1110 (in this case, four) and thus additional ternary MACs 1115 (in this case, two). In addition, in some such embodiments, a subset of the input values are wired to three of the dot product inputs rather than two. In this example, the four additional multiplexers allow for thirty-two of the activation inputs to be wired to three of the multiplexers rather than just two. For instance, the fourth activation input value 1105 (A3) includes three wire sets connecting to three different multiplexers 1110, as does the $143^{rd}$ activation input value (A142). These additional wires provide the compiler with more options for mapping the input values with nonzero corresponding weights to the multiplexers, and thus make this mapping process easier at a small cost in terms of overall circuit area. Other embodiments provide additional or different circuitry to provide the compiler with additional options for mapping the input values to the multiplexers.

FIG. 12 conceptually illustrates a process 1200 of some embodiments for executing a set of instructions (or a portion of a set of instructions) to compute the output of a neural network node (specifically, a convolutional or fully-connected node). The process 1200 is executed by the chip fabric of a neural network IC, such as that described above. Typically, the process 1200 is executed simultaneously for multiple nodes, and operations 1210-1240 are performed repeatedly for multiple activation windows (i.e., multiple groups of input values loaded into the activation window buffer) in order to completely execute a layer (or portion of a layer) of the neural network. In the case of the process 1200, the dot product can be computed in a single cycle and does not involve any split filter slices (i.e., no time-multiplexing is required).

As shown, the process begins (at 1205) by loading the weights for a node into filter slice buffers of one or more cores. In addition, the process loads (at 1210) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, in some embodiments the weights and activations for a node are divided among the filter slice and activation window buffers of all of the cores that are active for the current set of instructions. The storage of weight and activation values are described in greater detail below.

The process 1200 then computes (at 1215) partial dot products in the cores. As described above, the activation values loaded into the activation window buffers in each of the active cores are multiplied by their corresponding weight values loaded into the filter slice buffers of these cores. In some embodiments, the size of the partial dot products is reduced using the wiring structure shown in FIGS. 10 and 11, and with ternary weight values of {0, 1, −1}, the multiplication is handled by the ternary MAC circuits shown in these figures.

Next, the process aggregates (at 1220) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1200 then provides (at 1225) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1200 performs (at 1230) linear function post-processing operations. For all dot products, this includes the bias and scale operations described by reference to FIG. 8 above, with the values for these operations sent as configuration data from the cluster controller. In addition, certain dot products are aggregated over multiple cycles by the dot product input processing circuit (e.g., if time-multiplexing is required to handle dot products with a large number of components, or for dot products with double the standard number of bits).

Next, the process 1200 applies (at 1235) the non-linear activation function at the post-processing unit to complete the calculation of the node output value. In some embodiments, as shown in FIG. 8, a lookup table is used for this computation (e.g., a 5-bit to 4-bit mapping table). The mapping for each possible set of input bits is provided by configuration data from the cluster controller in some embodiments. Other embodiments use a configurable piecewise linear function.

In some embodiments, the operations 1215-1235 are executed to compute the node output without storing the any intermediate values in memory. That is, none of the partial dot products are stored in any memories (e.g., RAM) during the computation within the core, and the same is true before and during the aggregation within the dot product bus. In some embodiments, a register is used to aggregate multiple dot product bus inputs over multiple cycles. However, in a standard case (e.g., for 4-bit dot products), this register passes the dot product input through and the entire set of operations 1215-1235 is executed in a single clock cycle.

Finally, the process 1200 provides the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s). In some embodiments, once at the specified core, the node output value may be temporarily stored in a write cache until the write cache is full and the data is written to the core memory.

As mentioned, the process 1200 illustrates the most simplistic case for computing a dot product. For this simplest type of dot product computation, the neural network computation circuit of some embodiments places the following restrictions on the computation: (i) all of the input values should be of the specified discrete size (e.g., 4 bits), (ii) the maximum number of input activation values is the size of the input buffer multiplied by the number of cores (e.g., 144 inputs×16 cores=2304 total input values), (iii) all of the weight values are either 0, +α, or −α (and thus can be stored as 0, 1, and −1), and (iv) a large enough percentage of the weight values are 0 that the input values with non-zero weight values can each map to a different multiplexer input.

As mentioned above by reference to FIG. 9, each core is allocated a block of memory to store the weight data and activation values used by the core to compute dot products (i.e., the activation values that are loaded into the activation window buffer and the weight data that is loaded into the filter slice buffers). In different embodiments, the core memories may be separate blocks of memory or may be allocated out of a unified memory block. In some embodiments, each core is allocated the same amount of memory in total, which is divided between weight memory and activation memory for a particular network by the compiler that designs the program for the inference circuit to execute the network. Some embodiments require that each core be divided between weight memory and activation memory in the same manner (i.e., the allocation of weight/activation memory to each core is the same for all of the cores), while other embodiments allow for different allocations between the different cores depending on which layers the cores are involved with. For example, in some embodiments the allocation is the same for each core within a cluster but can vary between cores in different clusters (e.g., if a subset of cores are used for a majority of the layers of the network, then that subset of cores might need more of its memory allocated to weight data storage.

Within a core, the weight memory and activation memory partitions are themselves subdivided between layers of the network. As described above, all of the weight data used by a core is stored in the memory of that core at bootup time, because these values are the same for every input provided to the network. On the other hand, the activation values are determined at runtime (and occupy more memory per value than the weight data), so the cores do not store all of the activation values at one time. Depending on the type of network, only two layers of activations may need to be stored at once (the input activation values for the current layer being executed as well as the output activation values for that layer). In this case, once layer L is being executed (using the layer L activations as inputs and outputting the layer L+1 activations), the circuit can overwrite the layer L−1 activations. On the other hand, if a network has residual connections (i.e., the output activations from layer L are used as inputs for more than just layer L+1), then more than two layers of activations may need to be stored at once. As noted previously, for networks that are divided into first and second sets of layers with the first set of layers executed multiple times on different blocks of the input data, only the final activations from the first set of layers are used during the second set of layers in some embodiments.

Figure 13:
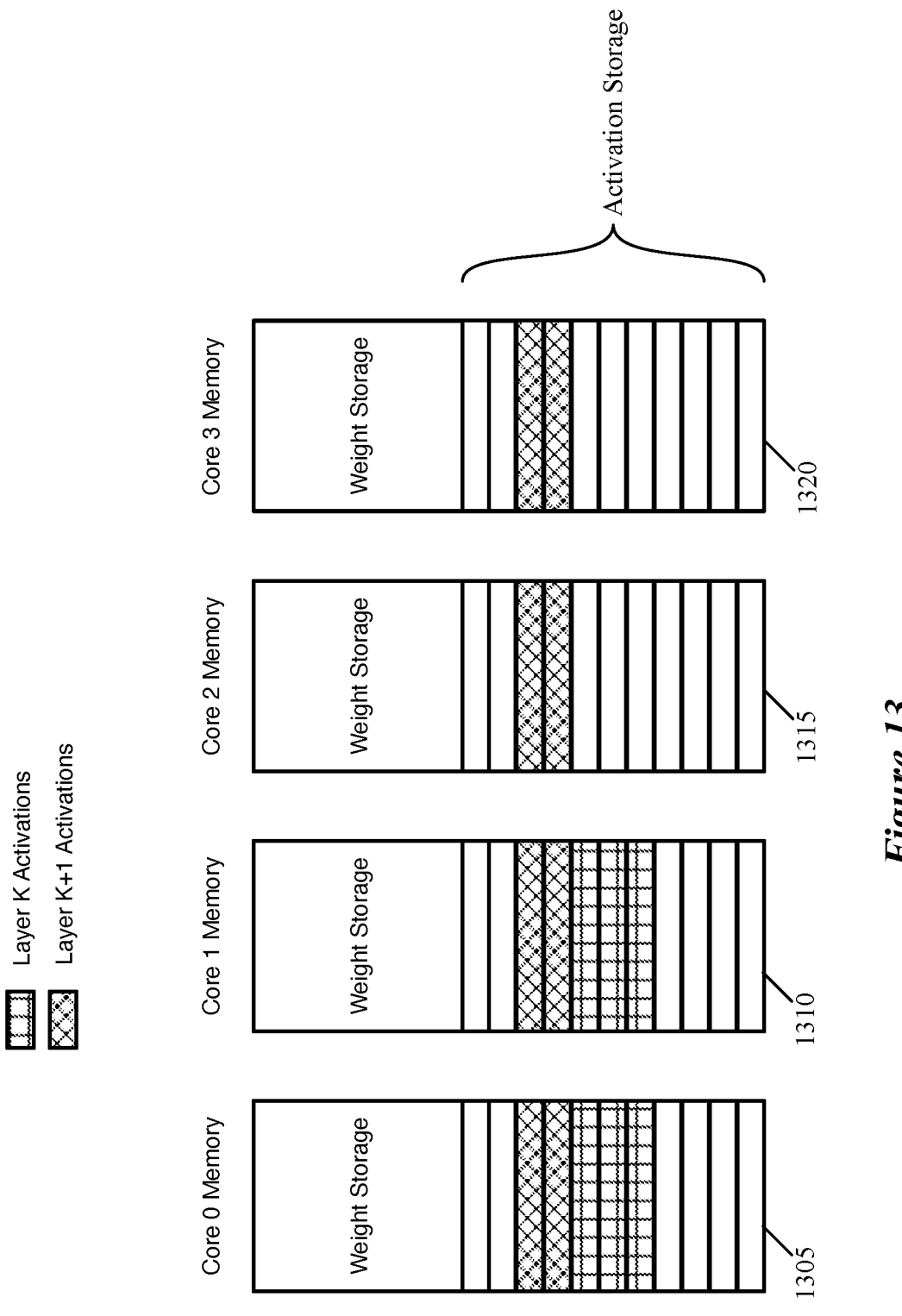
FIG. 13 conceptually illustrates the assignment of layers of activations to memories of four cores within a cluster.

FIG. 13 conceptually illustrates the assignment of layers of activations to memories 1305-1320 of four cores within a cluster. In this example, each of the cores is partitioned into weight storage (shown in the figure as a single block) as well as activation storage (shown as blocks of memory). Each of the blocks within the activation storage represents a set of memory locations (e.g., a bank of RAM, each containing numerous RAM words) in some embodiments. Though the figure shows a small number of such blocks within each core memory 1305-1320, it should be understood that a typical neural network computation circuit will have thousands of RAM words per memory. In addition, although the activation partition is larger than the weight partition in this example, the weight partition will often be the larger partition because all of the weight values for the entire network are stored in the memories at boot time.

The figure illustrates (using different types of cross-hatching) the memory portions allocated to the activation values (i.e., input activations) for each of two layers (layer K and layer K+1). In this example, the input activations for layer K are divided across the memories 1305 and 1310 for two of the cores (meaning that only these two cores participate in the dot product calculations for this layer), whereas the input activations for layer K+1 (which are the output activations for layer K) are divided across the memories 1305-1320 for all four illustrated cores. In some embodiments, when a particular layer is executed multiple times for different blocks of input data (and thus multiple blocks of output activations for the particular layer are calculated at different times), the same portion of core activation memory is used for each block of these output activations. However, the final set of intermediate activation data for the first set of layers will be concatenated and thus are stored in separate portions of activation memory (though these portions may be contiguous in some embodiments). For each of the layers, the first RAM word storing activations for that layer is aligned to the same memory address in some embodiments (i.e., the first activation for the layer stored in each core starts at an equivalent memory location within the respective core). In addition, the first activation for a layer starts at the beginning of a RAM word (i.e., the least significant bit in the word) in some embodiments.

In some embodiments, the activation values for a layer are divided evenly among the cores storing the activations for that layer (or as close to evenly as possible). Some embodiments require that the number of cores for a layer is a multiple of the number of cores in a cluster (e.g., a multiple of four). Other embodiments simply impose the requirement that the number of two-dimensional activation grids assigned to each core is equal (or as close to equal as possible). Referring to the three-dimensional structure of a layer of activations shown in FIG. 2, each two-dimensional grid of activations is assigned entirely to a single core. As such, if the number of activation grids is not evenly divisible by the number of cores to which those activations are assigned, then some of the cores will be assigned more of the actual activation values than other cores. However, some embodiments assign zero-grids (i.e., grids of activation values equal to zero) to make up the difference and even out the number of activations in each core for the layer. In other embodiments, rather than specifically ensuring the activation values are all zero (which would require generating one or more extra activation value grids of zeros and loading these values into the RAM each time the network is executed), the compiler ensures that the corresponding weight values stored in the weight memory are all zero, such that the data used for these activation value grids does not matter).

In some embodiments, as shown in FIG. 13, all of the activation values for a layer are assigned to a contiguous block of each core's memory. As described further below, in certain cases, a portion of a RAM word may be zero-padded (or left with unverified data that is not used in the computations for the layer) within this contiguous block of memory. In other embodiments, the activation values for a layer are allowed to be stored in multiple contiguous blocks within a core's memory (using offsets defined by the compiler), if doing so enables more efficient use of the core memory.

Figure 15:
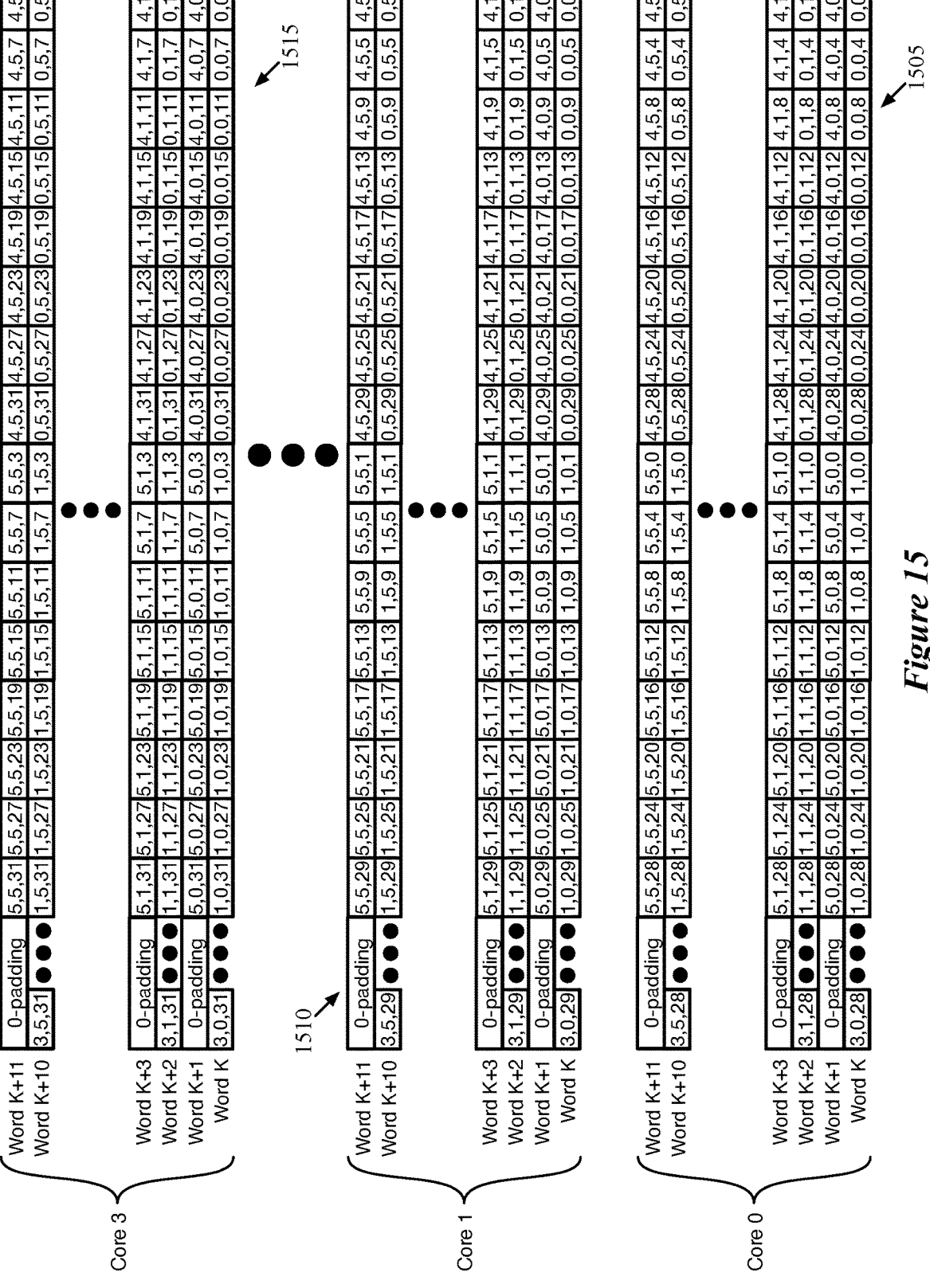
FIG. 15 conceptually illustrates the arrangement of the activation values of FIG. 14 among the memory of four cores.

FIG. 14 conceptually illustrates a layer of activation values 1400, and FIG. 15 conceptually illustrates the arrangement of these activation values 1400 among the memory of four cores according to some embodiments. As shown in FIG. 14, the layer K activation values are structured as a 6×6×32 layer (i.e., 32 6×6 grids, meaning that the previous layer most likely had 32 filters). Each activation value in the layer is labeled with a three-dimensional (x, y, z) coordinate. The x-coordinate refers to the column to which the activation belongs (0-5), the y-coordinate refers to the row to which the activation belongs (0-5), and the z-coordinate refers to the channel to which the activation belongs (0-31). Each of these activations will have different values depending on the input data provided to the network, but the activation value at a given coordinate will be stored in the same location in the core memories each time the network is executed.

FIG. 15, as mentioned, illustrates the arrangement of the activation values 1400 according to the activation storage rules of some embodiments. In this case, the compiler determined that the activation values 1400 of Layer K will be stored in four cores of the neural network computation fabric (Cores 0-3). The memories 1505-1515 of each of the cores include numerous banks of RAM in some embodiments, divided into words that can each be read from or written to individually. These words may have different lengths in different embodiments; in this example, the words are each 128 bits long. Thus, if the activation values are each 4-bit values (as is the case in some embodiments), then a single word can hold 32 activation values. When larger 8-bit activation values are used, then a single word holds 16 activation values. In the figure, each word is shown with the least significant bits on the right, which will be referred to as the "start" of the word. Thus, the rightmost 4 bits (least significant nibble) of each word hold the first activation value of the word. In addition, the words are ordered, with this example showing the first word in each core (or at least the first word for the illustrated layer of activation values) at the bottom of the diagram.

To optimize the use of the core memory as well as the efficiency with which the activation values are read from the core memory, some embodiments organize the activation values in the memory according to a set of defined rules (which are shown by way of example in FIG. 15). As mentioned, each two-dimensional grid of activation values (a channel) is assigned entirely to a single core. In this example, channels {0, 4, 8, . . . 28} are assigned to Core 0, channels {1, 5, 9, . . . 29} are assigned to Core 1, channels {2, 6, 10, . . . 30} are assigned to Core 2, and channels {3, 7, 11, . . . 31} are assigned to Core 3. The compiler may use different algorithms to assign channels of activation values to different cores in some embodiments, so long as the channels are assigned evenly (or as close as possible to evenly) to the cores.

The activation values within a core are not necessarily arranged with all of the activation values of a channel stored contiguously. Instead, within each core, some embodiments store all of the activations for a particular coordinate (i.e., an x-y coordinate) within the channels assigned to that core in a contiguous block. For a typical convolution, all of the activation values at a particular (x, y) coordinate will be used for dot product computations at the same time, so storing these values contiguously helps minimize resources used (and latency) for loading the activation values when computing the dot products for a layer.

As shown, the activation memory for layer K in each core starts with the activations at (0,0) for all of the channels assigned to that core. In this case, eight channels of activation values are assigned to each of the four cores (the 32 grids are evenly divisible by 4, so no zero-channels are required). Thus, the first eight values of the first word in each core (designated as word K) are the activations with (x, y) coordinates of (0,0). In some embodiments, if there are more channels assigned to a core than the number of activation values that a memory location (i.e., a RAM word) can store, then these are split up into separate sets of activations, and only a single word worth of activation values at the same coordinate are stored contiguously. That is, if 35 channels of activation values were assigned to Core 0, then only the first 32 activation values having coordinates of (0,0) would be stored in the first RAM word. Those first 32 channels would be stored as a contiguous block that iterates through each (x, y) coordinate, followed by the remaining 3 channels of activation values (stored in the same way, iterating through each (x, y) coordinate).

Within the memory 1505-1515 of each core, the first 8 activation values are those located at coordinate (0,0). Next, the algorithm for activation value storage moves to the activation values coordinate (1,0); that is, the x-coordinate is incremented as the next value in the same row of each grid is stored. This proceeds until the end of the current row is reached (i.e., the activation values with coordinate (5,0)). In some embodiments, once the end of a row in the activation grids is reached, the remainder of the current RAM word is 0-padded. As shown in the figure, this means that the last half (64 bits, or 16 activations) of word K+1 (as well as words K+3, K+5, etc.) in each of the memories 1505-1515 is 0-padded (or padded with unverified data that is never loaded into the activation window buffer). This pattern (arranging the activation values in row-major order) is repeated for each row of activation values in the channels assigned to a given core.

When loading the activation values as inputs to dot product computation, upon reaching the end of a row of the activation channels, the core memory controller returns to the start of the next row, and the activation values from the end of the previous row are not reused. The use of 0-padding (rather than starting the next row of activation values in the same RAM word) avoids the need to read multiple words when starting a new row of convolutional layer computations (which would require additional clock cycles).

As a result of this activation storage algorithm, a given memory location in one source core for a layer will store activations for the same x-y coordinates as that memory location in any of the other source cores. For example, the tenth activation in RAM word K+1 of Core 0 is the activation for coordinate (5,0) in activation grid 4. Correspondingly, the tenth activation in RAM word K+1 of any of the other cores is also an activation for coordinate (5,0), in different activation grids. Other embodiments allow the use of offsets between cores, so that the corresponding activations in one core are stored at different memory locations than in another core.

The weight values are stored in a similar manner, in some embodiments, with certain differences. Just as activation values for a layer are divided across multiple cores (and, specifically, the activation values for each particular dot product in a layer are divided across the multiple cores), the weight values for each filter in a layer also divided across these same multiple cores. Over the course of a convolutional layer, a particular weight value in a filter is multiplied by numerous activation values, all of which are in the same input activation channel. As such, each weight value is stored in the same core as the activation channel that contains the activations by which that weight value is multiplied. However, in some embodiments, the length of each filter slice may be different, even within a single layer, due to the different number of non-zero weight values. That is, even if a filter slice buffer always has 36 (or 40) weight values, the amount of memory required to store those weight values may differ depending on the number of non-zero weight values.

Figures 16, 17:
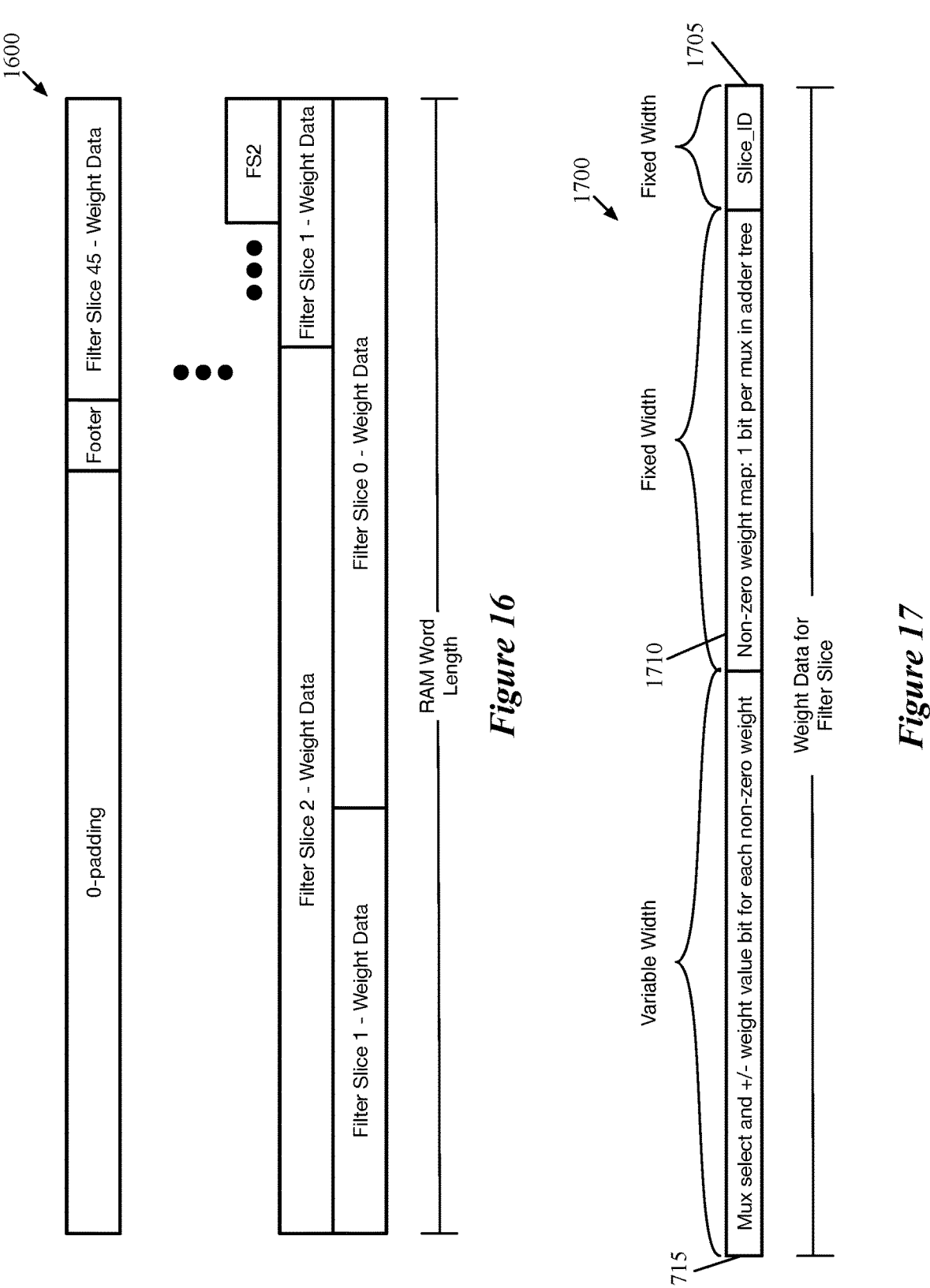
FIG. 16 illustrates the organization of a block of weight data within a single core for a single pass of the neural network computation.
FIG. 17 illustrates the format of the encoded weight data for a single filter slice in some embodiments.

FIGS. 16 and 17 illustrate the organization of the weight data in memory according to some embodiments. Specifically, FIG. 16 illustrates the organization of a block of weight data 1600 within a single core for a single pass of the neural network computation circuit (i.e., a layer or a portion of a layer of the neural network). In some embodiments, as with the activation data, each of the cores across which the dot products of the network layer are spread includes a similar weight data block starting at the same memory address. However, unlike in the case of activations, due to the encoding of the weight data, different cores will store different amounts of data for the same pass (which includes the same number of filter slices in each core).

As shown in FIG. 16, each filter slice is allocated a variable amount of memory. In some embodiments, the filter slices are stored in order based on the filter slice index (i.e., the index 0-63 of the filter slice buffer and the corresponding adder tree, dot product bus lane, and post-processing units), though storing this data in order is not required. In some embodiments, the amount of memory required depends on the number of non-zero weight values, with non-zero weight values requiring more data than weight values equal to zero. For example, in the encoding described below by reference to FIG. 17, a filter slice with all zero weight values would use 48 bits of memory (significantly less than a 128-bit RAM word), while a filter slice with entirely non-zero weight values (i.e., 40 non-zero weight values, corresponding to the 40 multiplexers that reduce the number of inputs to an adder tree from 144 to 40 as shown in FIG. 11) would use 208 bits of memory (more than a 128-bit RAM word).

In the example shown in FIG. 16, data is stored for 46 filter slices. If a pass does not use all of the filter slice buffers because there are fewer filters in a layer than the number of filter slice buffers in the cores (or a layer is divided evenly between multiple passes), some embodiments do not require data to be stored for all of the unused filter slices. The weight block 1600 (and all such weight blocks for a pass, in some embodiments) begin at the start of a RAM word, though the weight data for individual filters within that weight block are not required to begin at RAM word boundaries. As described above, the read cache can output activation or weight data that crosses a RAM word boundary, so that, e.g., all of the data for filter slice 1 could be loaded into the appropriate filter slice buffer at once (subject to constraints described below) even though it crosses the boundary between two RAM words. As shown, because the amount of data stored in a weight block is variable, a footer (e.g., a succession of 0s) is used to mark the end of the weight block 1600. Some embodiments then 0-pad the final RAM word of the weight block (or use random data, as this data will not be used) so that the next weight block can start at the beginning of the next RAM word.

FIG. 17 illustrates the format of the encoded weight data 1700 for a single filter slice in some embodiments. As shown in this example, some embodiments divide the weight data for a filter slice into three sections: a slice identifier 1705, a non-zero weight map 1710, and additional weight data 1715 for each of the non-zero weights. The slice identifier 1705 and the non-zero weight map 1710 have a fixed width (i.e., a fixed number of bits) in some embodiments, while the additional weight data 1715 has a variable width that depends on the number of non-zero weights in the filter slice.

The slice identifier 1705, in some embodiments, includes information indicating to which filter slice buffer the decoded weight data based on sections 1710 and 1715 will be written. This data includes (i) write enable bits for the primary and secondary filter slice buffers and (ii) a filter slice buffer index address. Thus, for a circuit with 64 filter slice buffers, the slice identifier includes 8 bits (1 bit for each of the write enables and 6 bits for the filter slice buffer index address). This information is not stored in the filter slice buffer, but is used by the control circuitry to ensure that the subsequent data is stored in the correct filter slice buffers. In some embodiments, only one of the write enable bits will be non-zero, while other embodiments allow for the same filter slice to be written to both primary and secondary filter slice buffers (e.g., in certain filter slicing cases).

The non-zero weight map 1710, in some embodiments, includes a bit for each of the multiplexers in the partial dot product computation circuit (i.e., the adder tree input multiplexers) corresponding to the filter slice buffer identified in the slice identifier 1705. Thus, for a chip fabric with partial dot product computation circuits as shown in FIG. 10, the non-zero weight map 1710 includes 36 bits. For a chip fabric with partial dot product computation circuits as shown in FIG. 11 (i.e., having redundant input multiplexers to better ensure that all of the inputs with non-zero weights are mapped to different input multiplexers), the non-zero weight map includes 40 bits. Each bit of the non-zero weight map 1710 specifies whether the corresponding input multiplexer receives an input with a non-zero corresponding weight value (with the bit set to 1 to indicate this case, and with the bit set to 0 to indicate that none of the inputs received by the multiplexer have non-zero corresponding weight values).

The variable width additional weight data 1715 includes additional data for each non-zero weight indicated in the non-zero map 1710. Thus, if all of the weights are zero for an entire filter slice, then no additional weight data 1715 is required (in certain cases, the entire filter slice can be eliminated in this case, and no data need be stored). For each non-zero weight indicated in the non-zero map, some embodiments store (i) a bit indicating whether that weight is positive or negative and (ii) select bits for the corresponding input multiplexer. The select bits for the input multiplexer are used to indicate which of the activation inputs that multiplexer selects to output to the adder tree, while the positive/negative weight bit is used along with the corresponding bit from the non-zero weight map 1710 to direct the operation of the corresponding ternary MAC. For the example multiplexers 1010 or 1110 that have eight inputs, three select bits are stored. The additional weight data 1715 is organized with the sets of data for each multiplexer in the same order as the bits in the non-zero weight map 1710. Thus, the first set of 4 bits in the additional weight data 1715 corresponds to the multiplexer indicated with the first non-zero in the non-zero weight map 1710 (which could be the first bit, second bit, etc. all the way to the last bit). In some embodiments, weight data decoder circuits are used to (i) align the non-zero weight map bits with their corresponding additional weight data within the filter slice buffer and (ii) fill in the additional data for the input multiplexers with no inputs corresponding to non-zero weights.

As noted, the neural network inference circuit of some embodiments stores the weights for all layers in memory for the entirety of the execution of the network, while the activation values are only stored as long as they are needed (e.g., for one or two layers in many cases) and then overwritten by activation values of later layers. Given these conditions, the amount of memory available for storing the weight values is limited by the layers with the largest number of activation values. That is, the amount of memory available for storing weight values is the total amount of weight/activation memory available in the neural network inference circuit minus the maximum memory required for storing activation values during the course of executing the network. In addition, as shown in FIGS. 16 and 17, filters with more non-zero weights require more memory. Thus, if this maximum activation memory requirement can be decreased (without affecting the network quality), then more non-zero weights can be stored for a network of a given size, thereby allowing for a less sparse network to be executed by the neural network inference circuit.

Some embodiments decrease this maximum activation memory requirement by propagating the input set through a portion of the network in blocks. Typically, the largest activation memory usage occurs during the first few layers of the network, when the number of activation values (a product of the channel size and the number of channels) is at its largest. Convolutional layers will often decrease the size of the channels (e.g., after several layers a 320×240 input channel size might have decreased to 80×60). While the input set is typically not as memory-intensive because there are only three channels, the structure of convolutional networks is such that the number of channels quickly increases (e.g., to hundreds of channels, thereby increasing the number of activation values stored for a layer) before the channel size substantially decreases enough to reduce the number of activation values for a layer down to a more reasonable amount. Thus, some embodiments propagate the input set through a first set of the layers of the network in blocks. This increases the time required to execute the network (because weights for these layers have to be loaded from memory into weight buffers multiple times) with the benefit that more memory is available for storing the weights.

Figure 18:
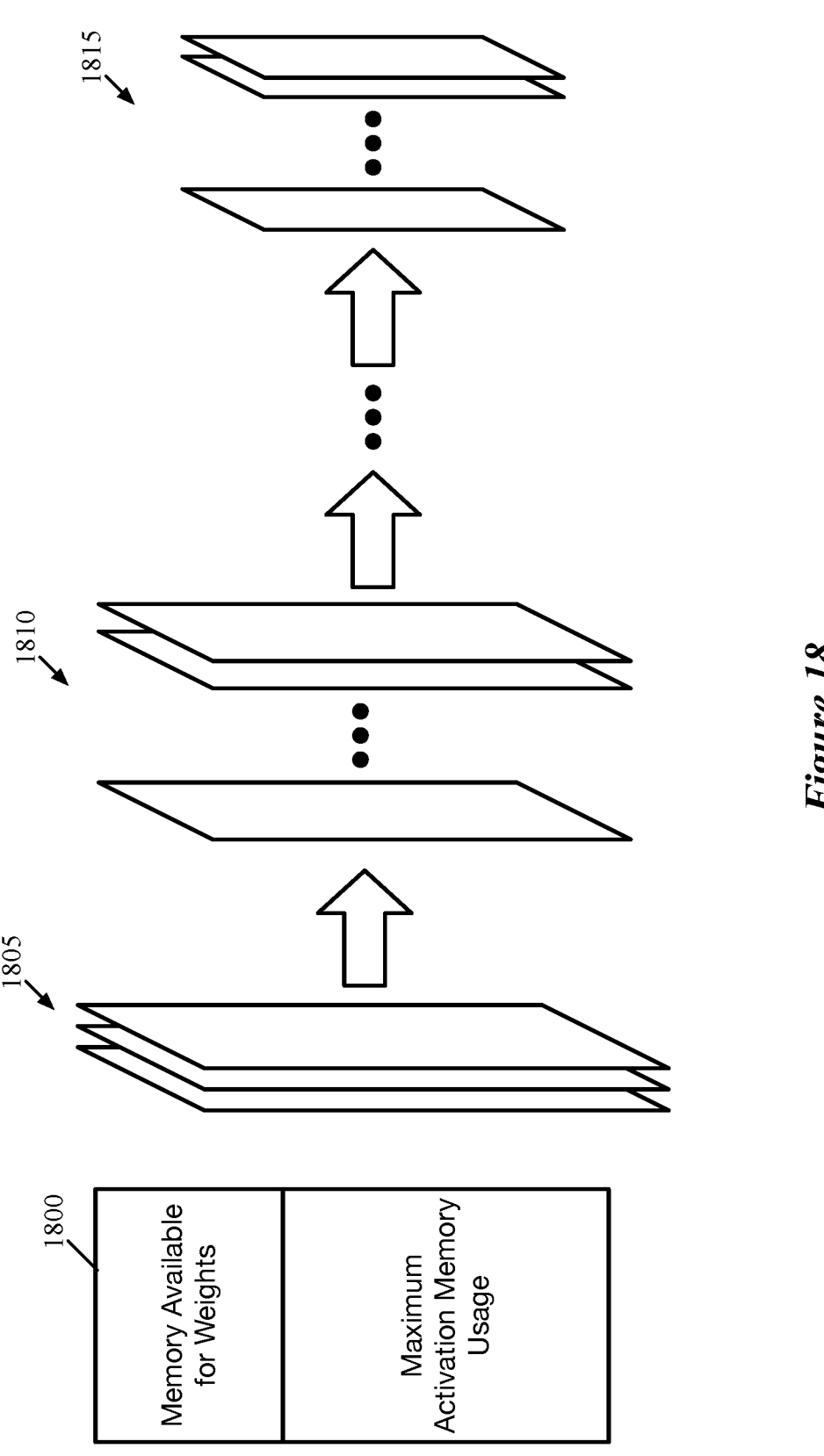
FIG. 18 conceptually illustrates activation channels over the course of a first network portion when the network is executed with all of the input data propagated at the same time through the network layers.

FIG. 18 conceptually illustrates activation channels over the course of a first network portion when executed as is standard (i.e., all of the input data propagated at the same time through the network layers). As shown, a set of input data 1805 is arranged as three channels (e.g., RGB channels for an image). A first convolutional layer transforms this input data 1805 into a large number of channels of activations 1810. These activation channels 1810 are smaller in size than the input channels 1805, but because there are many more (e.g., 64, 200, 512, etc.) the overall amount of data being stored is significantly greater. Over the course of one or more additional layers, the activation channels 1810 are transformed into activation channels 1815. These activation channels 1815 are smaller than the channels 1810, such that even if there are more of them the overall amount of data is smaller. As shown, executing the network in this manner results in a large maximum activation memory usage, which occupies a large portion of available memory 1800. The remaining memory is available for storing weight values.

Figure 19:
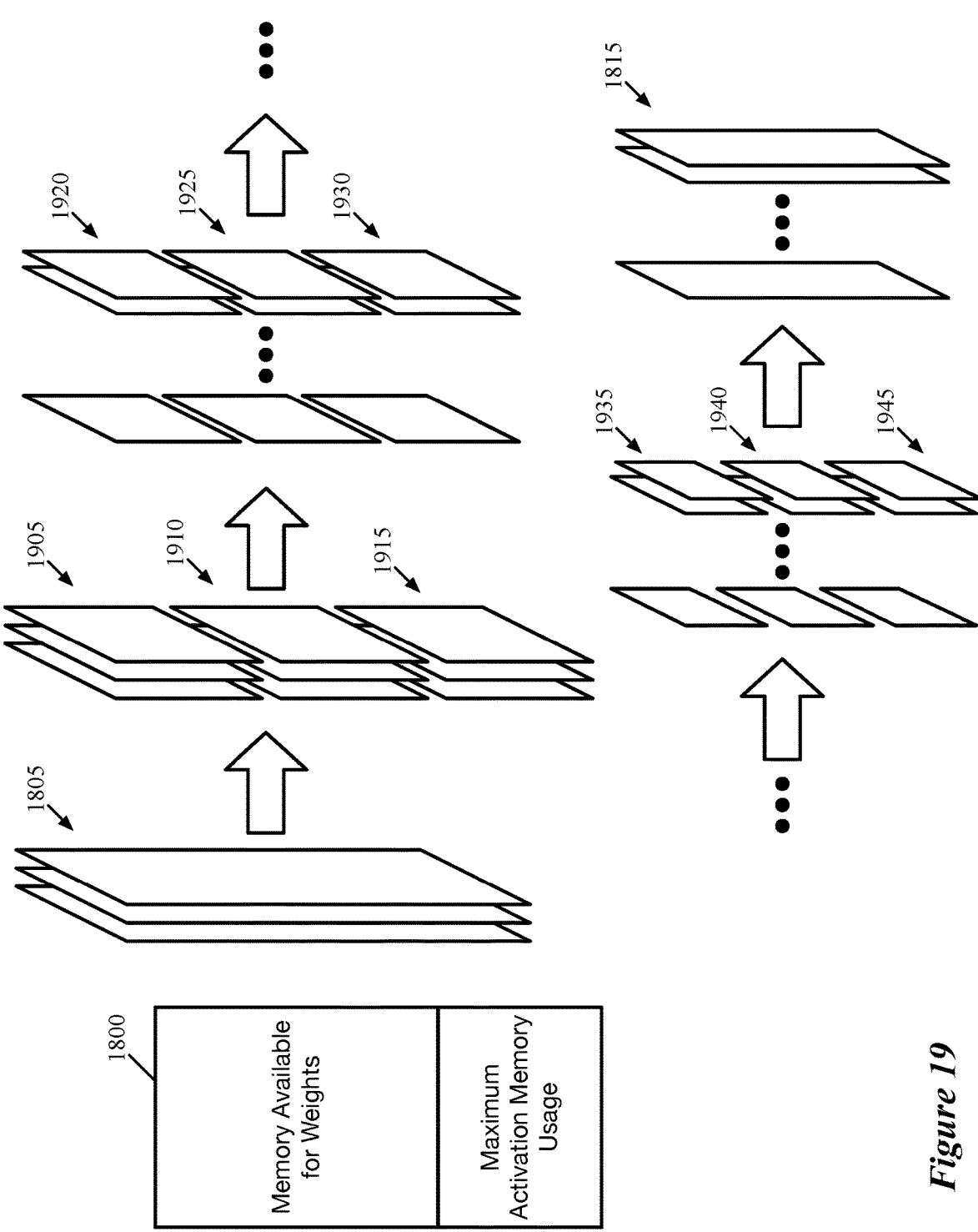
FIG. 19 conceptually illustrates how the same network uses less activation memory if a portion of the network is executed iteratively for multiple different blocks of the input data.

FIG. 19 conceptually illustrates how the same network uses less activation memory (and therefore makes available more memory for weights) if a portion of the network is executed iteratively for multiple different blocks of the input data. The same set of input data 1805 is arranged as three channels but is divided into three separate blocks of input data 1905-1915. The first convolutional layer transforms each of these input data blocks 1905-1915 into the same large number of channels of activations, but as blocks 1920-1930 that are each smaller than the entire set of activations 1805. Here, because there are three blocks of data 1920-1930 that do not need to be stored at the same time (and can, in fact, occupy the same memory space during their respective iterations of the first network portion), less of the overall memory 1800 (approximately one-third) is required for the first and second layers of the network. Over the course of the one or more additional layers, the activation channels 1920-1930 are respectively transformed (during separate iterations of these layers) into activation channel blocks 1935-1945. At each layer, one iteration requires less of the available memory 1800 (again, because this example uses three blocks of data, approximately one-third of the memory is required) than the corresponding fully executed layer shown in FIG. 18. The activation blocks 1935-1945 are combined into the activation channels 1815, which can then be propagated through the remainder of the network in the same manner as would be the case for FIG. 18. Because the memory-intensive early layers of the network are iteratively executed on separate blocks of data, the maximum activation memory usage is decreased, thereby enabling a much larger portion of the memory 1800 to be available for weight values.

Figure 20:
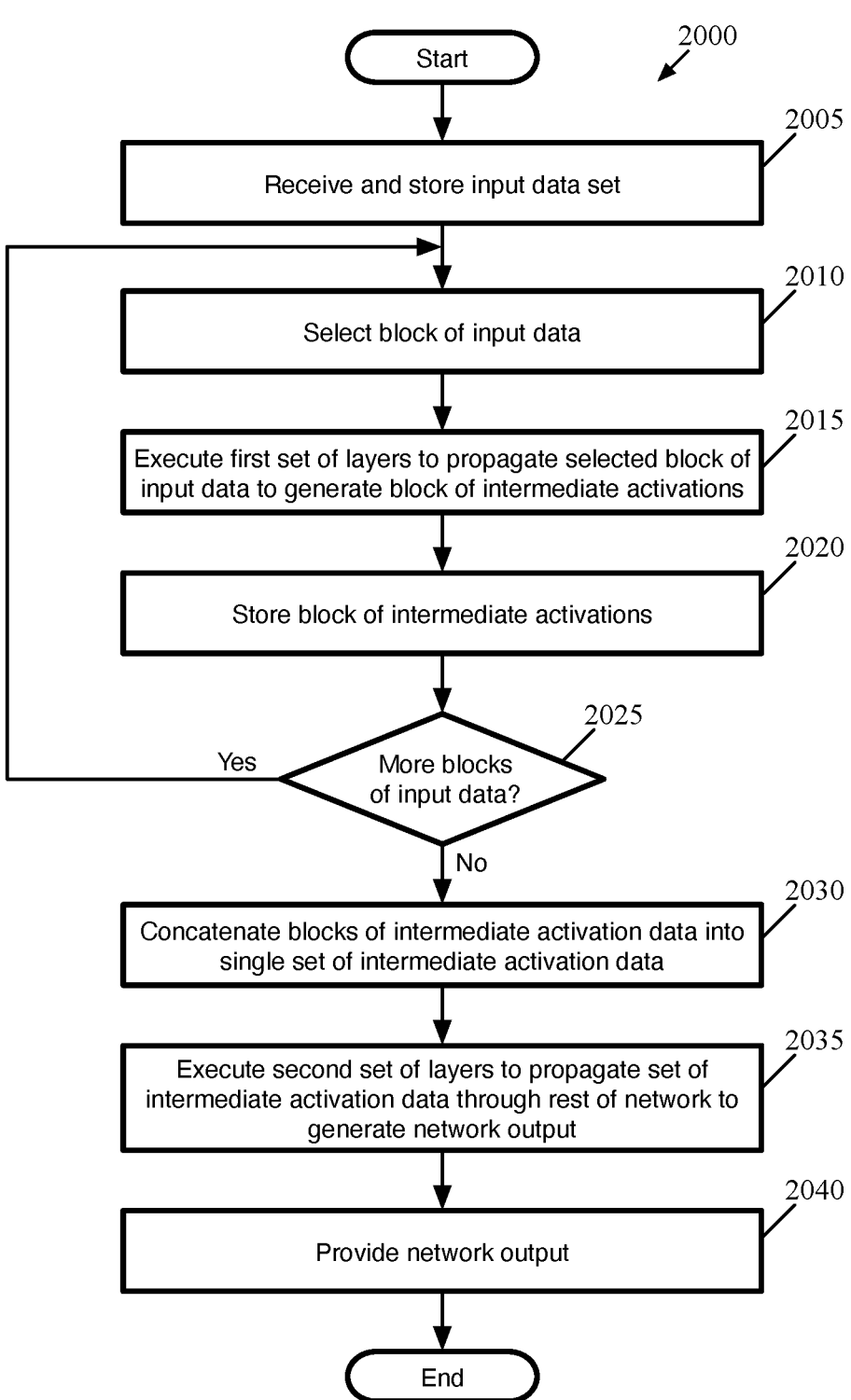
FIG. 20 conceptually illustrates a process of some embodiments for propagating input data through a first portion of a neural network in at least two blocks, combining the intermediate data from each of the blocks into a set of intermediate data, and propagating the set of intermediate data together through a second portion of the neural network.

FIG. 20 conceptually illustrates a process 2000 of some embodiments for propagating input data through a first portion of a neural network in at least two blocks, combining the intermediate data from each of the blocks into a set of intermediate data, and propagating the set of intermediate data together through a second portion of the neural network. The process 2000 is performed by a neural network inference circuit (e.g., the circuit described above) in some embodiments. In some embodiments, the neural network is a convolutional neural network with multiple layers. In addition, the first portion and second portion of the network are defined such that all intermediate data computed during the first portion of the network (other than the intermediate data generated by the last layer of the first portion) is not required for any layers of the second portion of the network.

As shown, the process 2000 begins by receiving (at 2005) and storing an input data set. In some embodiments, as described by reference to FIG. 3, this input data set is prepared by an input processing circuit (i.e., that is part of the same integrated circuit as the neural network inference circuit). In some embodiments, the input processing circuit or the CPU of the integrated circuit loads the input data into an I/O buffer, and the data is loaded from this buffer into the core memories. The structure of the input data depends on the type of input analyzed by the neural network. For instance, if the network analyzes images (e.g., for face or object recognition, motion analysis, etc.), the input data set is often structured as three channels of input activations (e.g., RGB channels, or YCbCr channels). The input data set is stored in a set of core memories of the neural network inference circuit in some embodiments, as a set of input activation values for a first layer of the network.

The process 2000 then selects (at 2010) a block of input data. As the neural network inference circuit of some embodiments operates according to specific instructions for each layer or portion of a layer that specify the locations of the input activations in core memory (e.g., based on a starting location), the selection of the block of input data is actually based on the instructions generated by the compiler and sent from the microprocessor to the neural network inference circuit at runtime. That is, the blocks of input data are not random but rather the same memory locations (representing the same portion of input data) are selected for each block each time the network is executed.

In some embodiments, for input data arranged as multiple grids of input activations, the data is divided into blocks such that each block includes a contiguous group of multiple complete rows of activations from each channel. The input blocks are not required to be the same size, though for efficiency in memory usage some embodiments attempt to make the blocks as close to the same size as possible (e.g., dividing the input into halves, thirds, etc.). In some embodiments, due to the nature of convolutional layers as well as how the activation values are stored and how these layers are executed by the neural network inference circuit, the input set is divided into blocks such that rows of input activations are kept together within a block. As described above by reference to FIG. 2, in some embodiments a filter has dimensions of k×k×c (where c is the number of input channels), and is convolved over k rows at once, then moved down by a predetermined amount to be convolved over the next set of rows. Additionally, some embodiments store the activation values in memory in channel-row-column order, as shown above by reference to FIG. 2. That is, all of (or groups of) the values with the same (x, y) coordinates are stored together in groups, with these coordinate groups next ordered by row.

Figure 21:
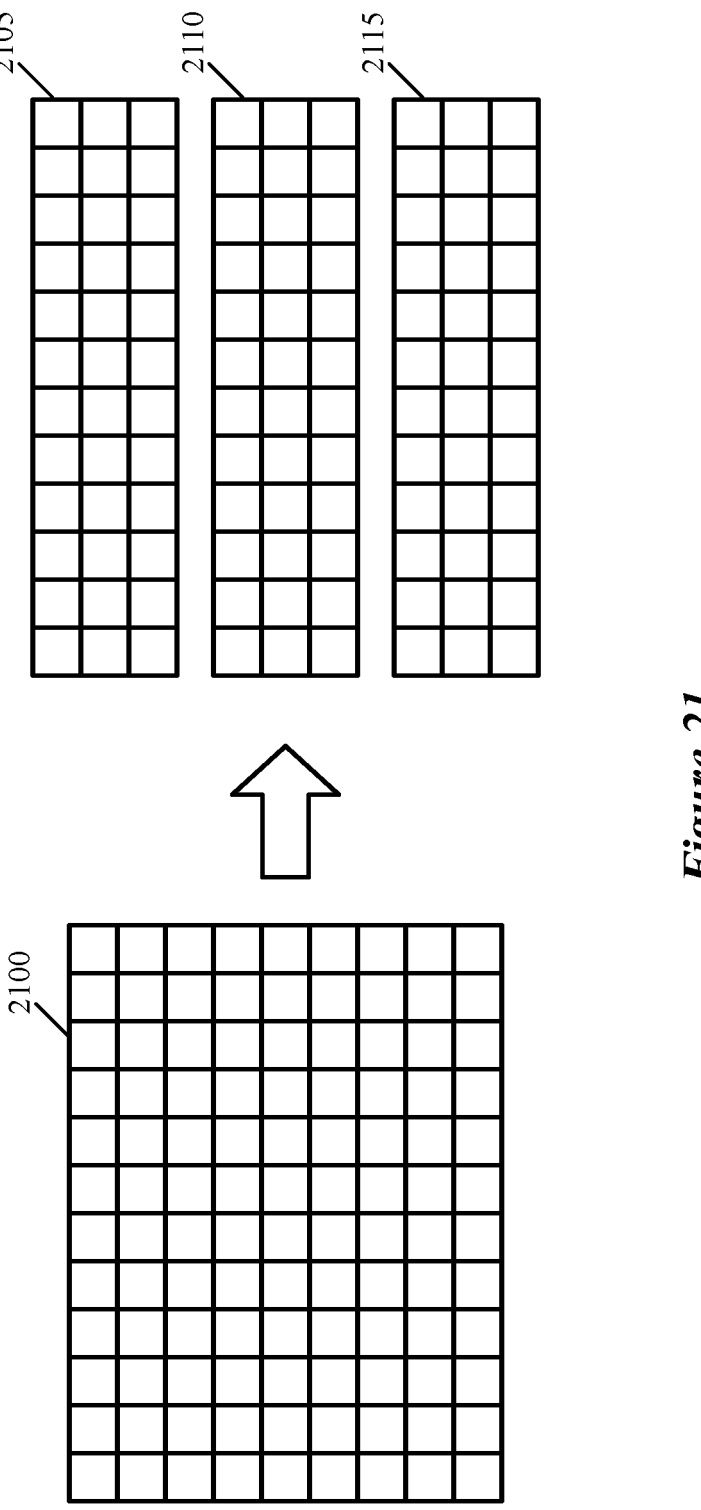
FIG. 21 illustrates a single channel of input activations arranged in a 12×9 grid that is divided into three 12×3 grids.

Given this structure, some embodiments divide an X×Y×C set of input values into multiple X×Y$_1$×C blocks, where Y, is less than Y (e.g., ½, ⅓, ¼, etc.). FIG. 21 illustrates a single channel of input activations arranged in a 12×9 grid 2100. This channel of inputs 2100 is divided into three 12×3 grids 2105-2115, and each other input channel (not shown) would be divided in the same manner. It should be noted that while the description here relates to dividing the input data along the y-axis (i.e., keeping rows together), other embodiments divide the input data along the x-axis (keeping columns together). In some such embodiments, the neural network inference circuit stores the activations in channel-column-row order and convolves filters along a set of columns before moving to the next column (rather than along a set of rows).

Next, the process 2000 executes (at 2015) a first set of layers of the network to propagate the selected block of input data through the first set of layers and generate a block of intermediate activation data. That is, the neural network inference circuit receives and executes instructions from the microprocessor to execute the first layer for the selected block of input data, store the output activations in core memory (without overwriting at least the remaining blocks of input data), execute the second layer on those output activations, etc., through the completion of the first set of layers.

The last layer of this first set of layers generates a block of intermediate activation values, and the process 2000 stores (at 2020) this block of intermediate activation values. In some embodiments, these intermediate activation values are stored in a contiguous block as described above by reference to FIG. 15. So long as the blocks are defined so as to include complete rows of input values (for all channels), the corresponding intermediate activation blocks will have the same arrangement (assuming standard convolutional layer properties), and thus the intermediate activations can be stored in row-major order with activation values having the same coordinates for different channels stored together, as shown in FIG. 15. The blocks of intermediate activations are stored, in some embodiments, in the cores that will be used to execute the first layer of the second set of layers of the network (i.e., the set of layers that apply to the entirety of the data rather than only a block).

The process 2000 then determines (at 2025) whether additional blocks of input data remain. As noted, this is a conceptual illustration of the process performed by the neural network inference circuit of some embodiments, which does not actually perform a determination operation. Rather, the instructions received from the microprocessor (which were previously generated by a compiler) specify whether the next layer for the circuit to execute is the first layer of the network applied to another block of input data or the first layer of the second set of layers applied to the entire set of the intermediate activations (or instructions to move intermediate activations around so as to combine the separate blocks of activations.

If additional blocks of input data remain, the process 2000 returns to 2010 to select the next block of input data, propagate that block of input data through the first set of layers of the network, and store the resulting block of intermediate activations. In some embodiments, the instructions received by the neural network inference circuit for each iteration through these layers are slightly different, in that the instructions for the first of these layers specify to use a different block of input data (with different memory locations) as the input activations for that layer, and that the instructions for the final layer of the first set specify to store the block of intermediate activation data in a different memory location. In some embodiments, the intermediate activation data for each successive block is stored using the next RAM word (in the memory of each relevant core) after the last row of intermediate activations from the previous block, so that the activations are all aligned for the second set of layers. For the activations internal to the first set of layers (e.g., the output of the first layer through the input of the last layer), some embodiments use the same memory locations for each iteration through these layers (as these activation values from one iteration are no longer needed for either the subsequent iteration or the second set of layers). This allows for the most memory-intensive layers to require less of the memory than if the entire input was propagated through these layers at once.

Once all of the blocks of input data have been propagated through the first set of layers, the process concatenates (at 2030) the blocks of intermediate activation data into a single set of intermediate activation data. In different embodiments, this may involve actual operations of the neural network inference circuit (or other entity performing the operation) or may simply be a conceptual operation. For instance, if the neural network is executed by a software program executing on a general-purpose processor, then the program may require the blocks of intermediate activation data to be concatenated to keep track of the input block for the next layer. On the other hand, for the neural network inference circuit described above, if each block of intermediate data is stored contiguous to the previous block, then the activation data may already be arranged as shown in FIG. 15. In this case, no specific instructions are needed for the circuit to concatenate the blocks of intermediate activation data.

The process 2000 then executes (at 2035) a second set of layers of the network to propagate the entire set of intermediate activation data through the remainder of the network and generate a network output. That is, the neural network inference circuit receives and executes instructions from the microprocessor to execute the first layer of this second set for entirety of the intermediate activation data output by the last layer of the first set of layers, store the output activations of this layer in core memory, execute the next layer on those output activations, etc., through the completion of the network.

Finally, the process 2000 provides (at 2040) the network output. The process 2000 then ends. This network output may be information regarding the categorization of an object in an image, the presence or absence of an object in an image, analysis of an audio recording, or any other data generated by a neural network. In some embodiments, the neural network inference circuit provides the network output to the microprocessor of the integrated circuit via an IO buffer (e.g., the same IO buffer that is used to provide the input data to the neural network inference circuit). Other embodiments use other mechanisms to provide the network output to a recipient.

It should be noted that while this process assumes the network has a first set of layers that are executed multiple times for separate blocks of input data and a second set of layers that are executed once for the entirety of the intermediate data, other embodiments could have multiple separate sections with iterative execution if needed for memory savings. That is, such a process would execute a first set of layers iteratively on multiple blocks of input data to generate a first set of intermediate activation data, execute a second set of layers once on the entire first set of intermediate activation data to generate a second set of intermediate activation data, execute a third set of layers iteratively on multiple blocks of the second set of intermediate activation data to generate a third set of intermediate activation data, etc., until the completion of the network.

In the above example shown in FIG. 21, the input data is divided such that the blocks of input data are completely separate (i.e., each input activation value belongs to exactly one block of input data). It should be noted that in some embodiments, the division of the input data is such that the blocks have partial overlaps. In many networks, the generation of the intermediate activation values for a first block at the end of the first set of layers requires certain input data that is also used to generate the intermediate values for a second block. Again referring to each channel as a two-dimensional grid of activation values divided into separate blocks of rows, the bottom rows of the top block require some of the same input activation values as the top rows of the next block. Some embodiments identify the receptive field within the input activations for each intermediate activation value output by the last of the first set of layers and ensure that all of the input activation values required to compute each block of intermediate activation values for a block are included in the corresponding input block.

Figure 22A:
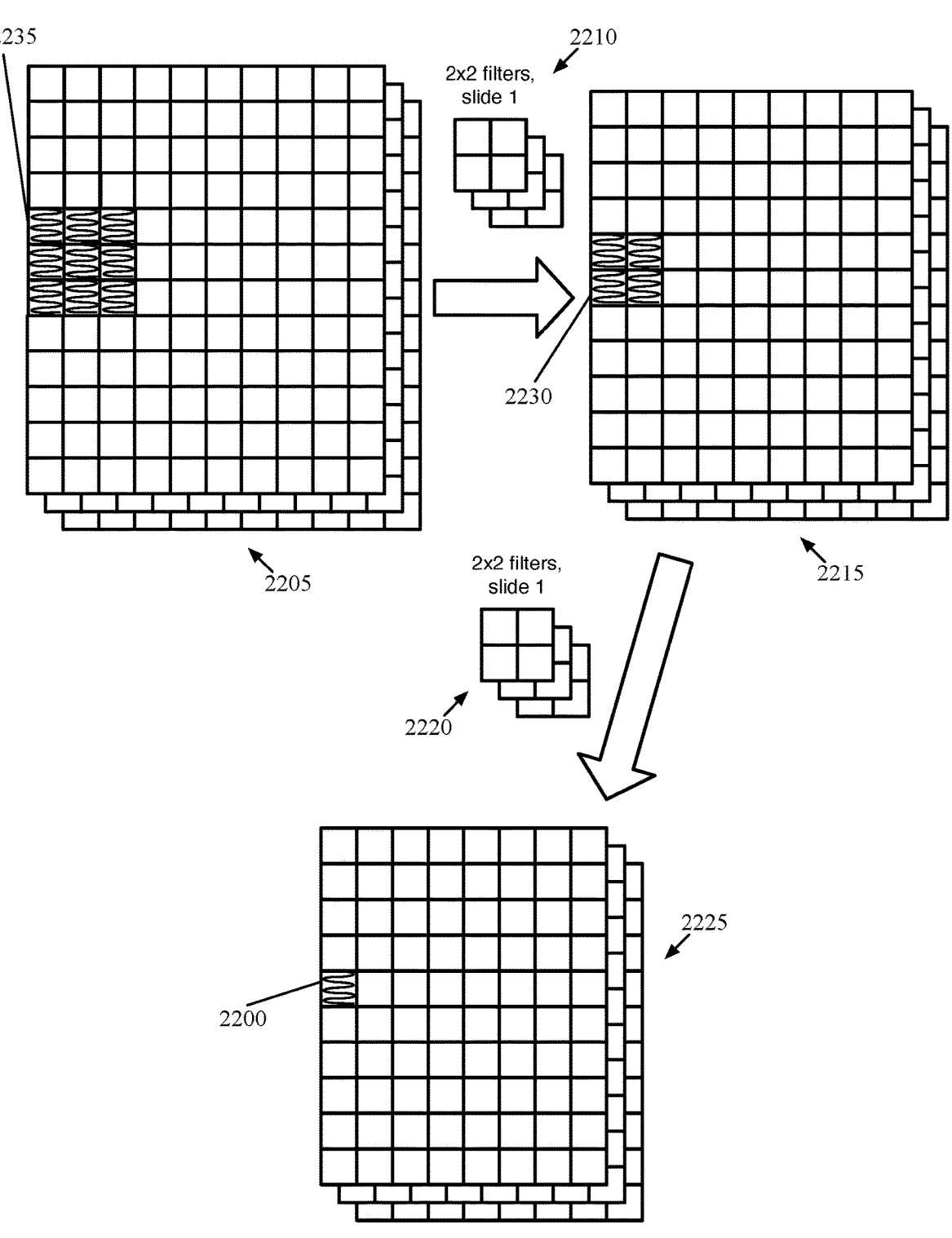
FIGS. 22A-B conceptually illustrate a receptive field computation and the resulting overlap for a portion of the network that includes two layers of filters.
Figure 22B:
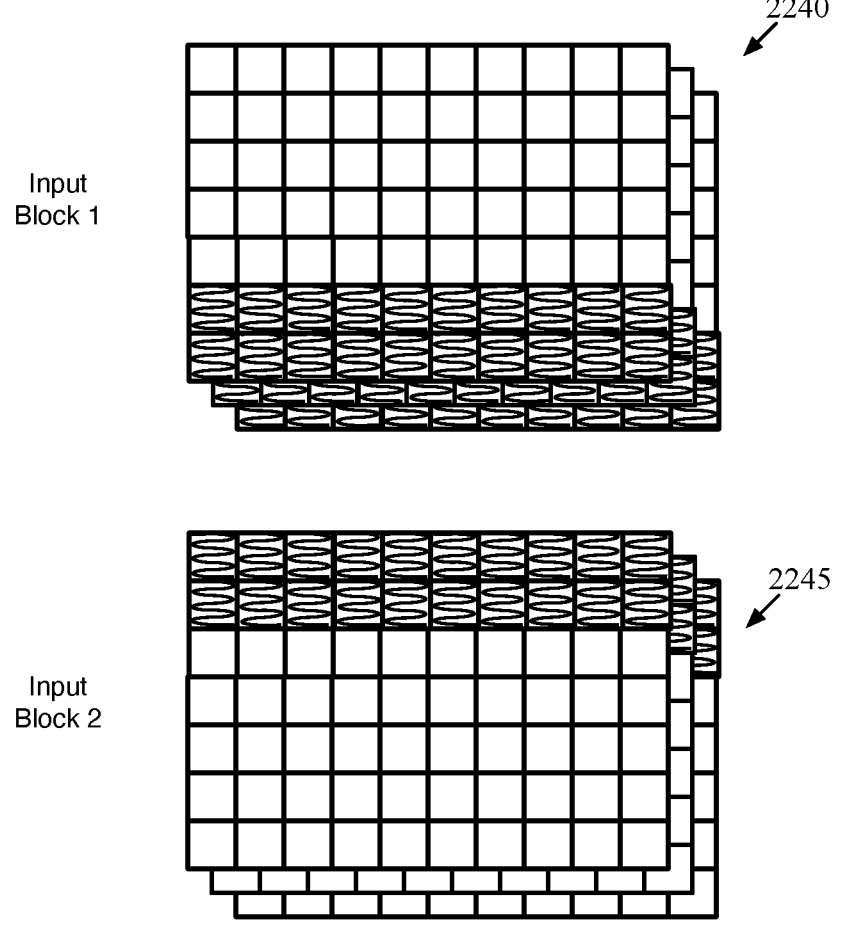

FIGS. 22A-B conceptually illustrate this receptive field computation and the resulting overlap for a portion of the network that includes two layers of filters. FIG. 22A illustrates a set of input channels 2205 that are transformed through a first layer 2210 of 2×2 filters into a first set of intermediate activation channels 2215. This first set of intermediate activation channels 2215 is then transformed through a second layer 2220 of 2×2 filters into a second set of intermediate channels 2225. Though each set of intermediate activations 2215 and 2225 is shown to only have three channels (indicating that each of the layers 2210 and 2220 only has three filters), it should be understood that a typical neural network will have many more filters (and thus many more intermediate activation channels).

The filled-in activation 2200 in the second set of intermediate activation values 2225 represents one of the activations on the boundary between the upper and lower blocks of the second set of intermediate activation values 2225 if the goal is to divide the input data into two blocks (i.e., dividing the input data into two blocks should result in the intermediate activation values at the end of the first network portion being divided into two blocks of completely separate data). With the second layer 2220 having 2×2 filters (with a slide of 1 and no zero-padding), this activation value 2200 is computed based on the activation values at four coordinates 2230 shown as filled-in in the first set of intermediate activation values (i.e., based on the dot product of these activation values in all of the channels 2215 with one of the filters in the layer 2220).

Each of the activation values at these four coordinates 2230 is based on the activation values at four coordinates of the input channels 2205, with some overlap (because the horizontal and vertical slide is only 1 for the layer 2210). With this first layer 2210 also having 2×2 filters with a slide of 1 and no zero-padding, the activation values at the four coordinates 2230 are computed based on the input values at nine coordinates 2235 (i.e., dot products of sets of activation values at these coordinates and each of the filters of the layer 2210). Thus, the receptive field in the input activations for the activation value 2200 is the activation values at the nine coordinates 2235. While the upper two rows of these values are part of the upper half of the input activations, the bottom row of values belong to the bottom half of the input activations.

FIG. 22B conceptually illustrates how this receptive field calculation results in the division of the input activations into two blocks of input values 2240 and 2245. The goal is to have the two have the second set of intermediate activations 2225 divided evenly into two blocks with no overlap. For this to be possible, the upper seven rows of the input activations 2205 are part of the first input block 2240 and the bottom seven rows of the input activations 2205 are part of the second input block 2245. Here, the filled-in activations represent input activations that belong to both input blocks 2240 and 2245. It should be understood that a larger set of network layers that are executed iteratively and/or larger kernel sizes for the filters (e.g., 3×3, 5×5, etc.) will typically result in a larger overlap of input blocks because the receptive field in the input activations is larger for the boundary activations of the intermediate activation channels. This overlapping data creates a certain amount of overhead in that certain calculations are performed multiple times (e.g., for two different blocks) and the overlapping activation values are stored in and loaded from memory multiple times. However, in many cases this overhead is worth the increase in weight memory storage.

As mentioned above, the instructions specifying how the neural network inference circuit of some embodiments executes a neural network are generated by a compiler in some embodiments. This compiler, in some embodiments, is responsible for determining the first and second portions of a network based on the weight and activation memory requirements for the network (as the compiler is aware of the available weight/activation memory of the neural network inference circuit) and determining how the input activation data will be divided into blocks (e.g., how many blocks, the overlap of the blocks, etc.). The compiler can then generate the instructions for the neural network inference circuit to iteratively execute the first set of layers followed by a single execution of the second set of layers for each input provided to the circuit.

Figure 23:
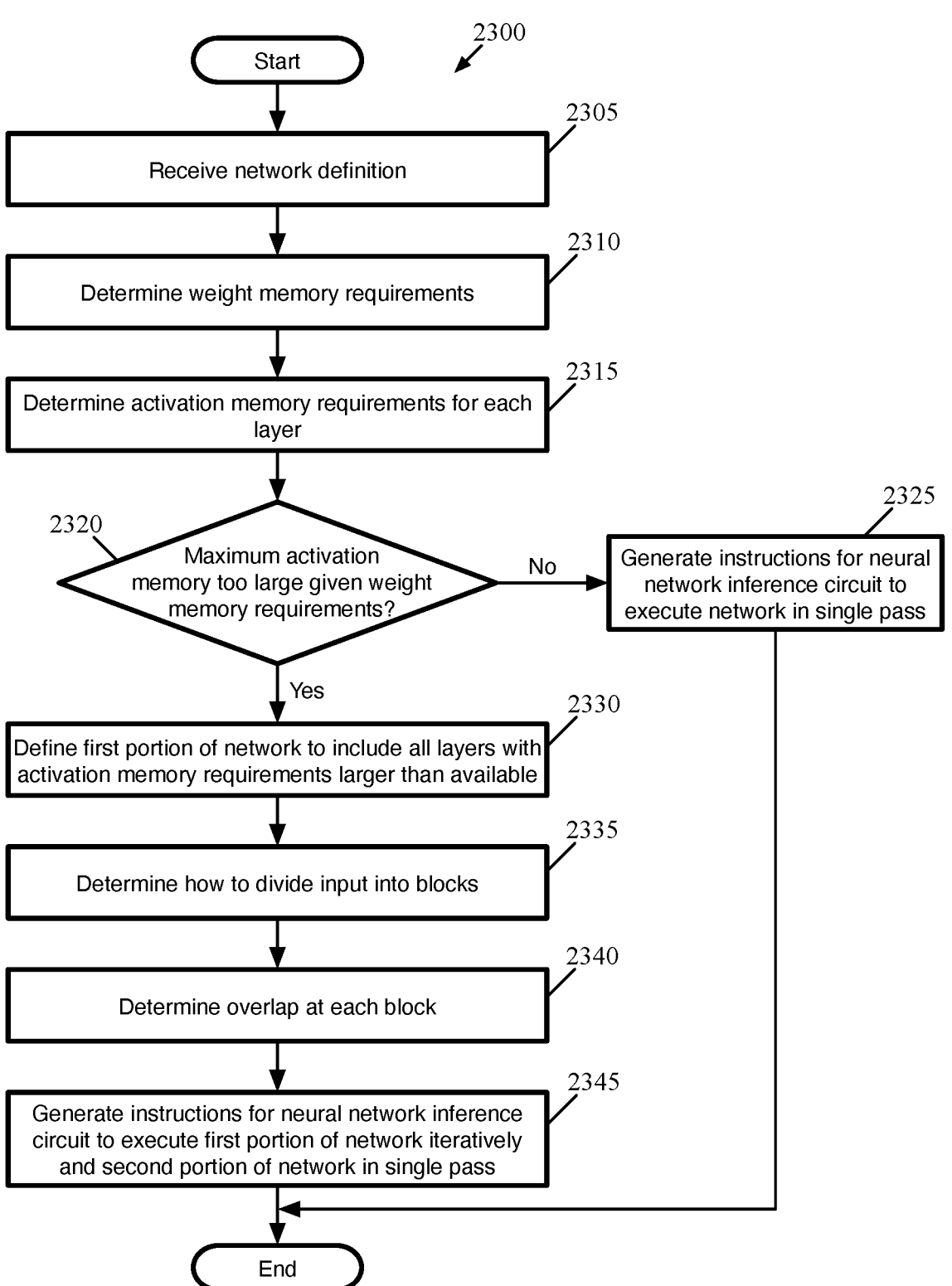
FIG. 23 conceptually illustrates a process of some embodiments for generating instructions that configure a neural network inference circuit to execute a first portion of the network iteratively for blocks of input data and then execute the second portion of the network together.

FIG. 23 conceptually illustrates a process 2300 of some embodiments for generating instructions that configure a neural network inference circuit to execute a first portion of the network iteratively for blocks of input data and then execute the second portion of the network together. The neural network inference circuit, in some embodiments, is structured as described above or similarly to the circuit described above. In some embodiments, the process 2300 is performed by a compiler that is designed for the specific neural network inference circuit, so as to generate instructions compliant with the requirements of the circuit.

As shown, the process 2300 begins by receiving (at 2305) a definition of the machine-trained network (e.g., a convolutional neural network) for which instructions are to be generated. In some embodiments, the network is trained for a particular purpose (e.g., face recognition, object classification, etc.) using various training techniques. Some embodiments train the network using techniques that ensure that the network weights are ternarized and that a particular percentage of the weights are set to zero (i.e., that the network meets a sparsity requirement), so that the network meets requirements for the circuit that will execute the network. In some embodiments, the network definition is received in a particular format for the compiler that meets certain specifications.

The process 2300 determines (at 2310) the weight memory requirements for the network. In some embodiments, the weight memory required for a network is based on (i) the overall number of weights, (ii) the number of non-zero weights, and (iii) how the zero and non-zero weights are structured within filters. As noted above, because of the way the weight values are encoded in some embodiments, non-zero weights require more memory than zero weights. Furthermore, if all weights in a filter are zero, then this can enable additional weight savings (e.g., the compiler can assume that the entire resulting channel of activations will be zero in some cases, with additional downstream and/or upstream effects. As the compiler generates the encoding for the weight values of the network, the compiler can precisely determine the required memory for the weights in some embodiments.

The process 2300 also determines (at 2315) the activation memory requirements for each layer. Assuming that the neural network inference circuit quantizes the activation values, each activation value requires a specific amount of memory (e.g., 4 bits, 8 bits, etc., as specified for the particular network). The compiler of some embodiments determines how many activations are computed for each layer, as well as the arrangement of those activations in channels. The arrangement of the activations affects the storage requirements because that determines how much zero-padding is required at the end of each row within a layer. In addition, the compiler can identify when layers of activations can be overwritten (i.e., based on whether those activations are needed at any future point in the network other than the immediate next layer). This can be due to recurrence, element-wise operation layers that combine activations from multiple layers, etc.

Based on these computations for the weight and activation memory requirements, the process 2300 determines (at 2320) whether the maximum activation memory is too large given the weight memory requirements. As noted, the weight values are loaded into the core memories at bootup of the neural network inference circuit in some embodiments, and thus occupy that memory throughout the execution of the network. Activation values vary from input to input and are only stored as long as needed, which is typically only for a layer or two. The compiler is programmed with the exact memory specifications of the neural network inference circuit and in some embodiments is responsible for determining the specific location in core memory of each activation value and set of encoded weight values, as well as identifying when each activation value can be overwritten. Thus, the compiler can determine whether the network can be executed without iterative execution of any of the layers based on whether the maximum activation memory requirements are too large given the overall memory available and the weight memory requirements.

When the maximum activation memory requirements are less than the available core memory, the process 2300 generates (at 2325) instructions for the neural network inference circuit to execute the network in a single pass (i.e., without iteratively executing any of the layers). These instructions, in some embodiments, specify each layer for the network to execute (i.e., the type of layer, kernel sizes, etc.) as well as the memory locations for each encoded filter and each channel of activation values.

On the other hand, when the maximum activation memory requirements are too large given the available memory, the process 2300 defines (at 2330) a first portion of the network to include all layers with activation memory requirements that are larger than this available memory. Some embodiments define this first portion of the network to be as few layers as possible, because each additional layer that is executed iteratively adds to the overhead. Each additional layer in the first portion of the network (i) requires the filters of the layer to be re-loaded from memory into the filter slice buffers of the active cores and (ii) increases the size of the overlaps in the input data due to a larger receptive field in the input data set for the activation values at the end of the first portion of the network.

The process determines (at 2335) how to divide the input into blocks and determines (at 2340) the overlap at each block of input data. As described by reference to FIGS. 22A-B, the overlap at each block of input data is based on the receptive field in the input data for each activation value at the end of the first portion of the network. The number of overlapping rows at each break between input blocks is therefore the same irrespective of the number of blocks into which the input data is divided. Thus, a larger number of input blocks results in more overhead because (i) the filters for all of the layers will have to be loaded from memory more times and (ii) more calculations will have to be made twice (because there are more overlaps). Some embodiments allow a user to specify the number of blocks into which the input is divided, while in other embodiments the compiler makes this determination (e.g., by determining the minimum number of input blocks that will allow the memory requirements to be satisfied).

The process 2300 then generates (at 2345) instructions for the neural network inference circuit to execute the first portion of the network iteratively (the number of iterations being based on the determine number of input blocks) and then execute the second portion (i.e., the remainder) of the network in a single pass starting from the combined blocks of intermediate data generated by the first portion of the network. That is, the compiler generates instructions for the neural network inference circuit to execute the process 2000 (or a similar process). In some embodiments, the instructions from the compiler specify each iteration as a completely separate set of layers (e.g., if the first portion of the network is five convolutional layers, then the instructions simply specify fifteen convolutional layers, with the difference between the iterations being the source in memory of the input activation values for the first layer and the destination in memory for the output activation values of the fifth layer). In other embodiments, the neural network inference circuit is designed to recognize and execute an instruction that specifies (i) the number of layers in the first portion of the network, (ii) the number of input blocks (or specific memory locations of each input block), and thus the instructions generated by the compiler only need to specify this information.

The neural network inference circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the neural network inference circuit to be executed on the device. These devices can include mobile devices, desktop computers, Internet of Things (IoT devices), etc.

Figure 24:
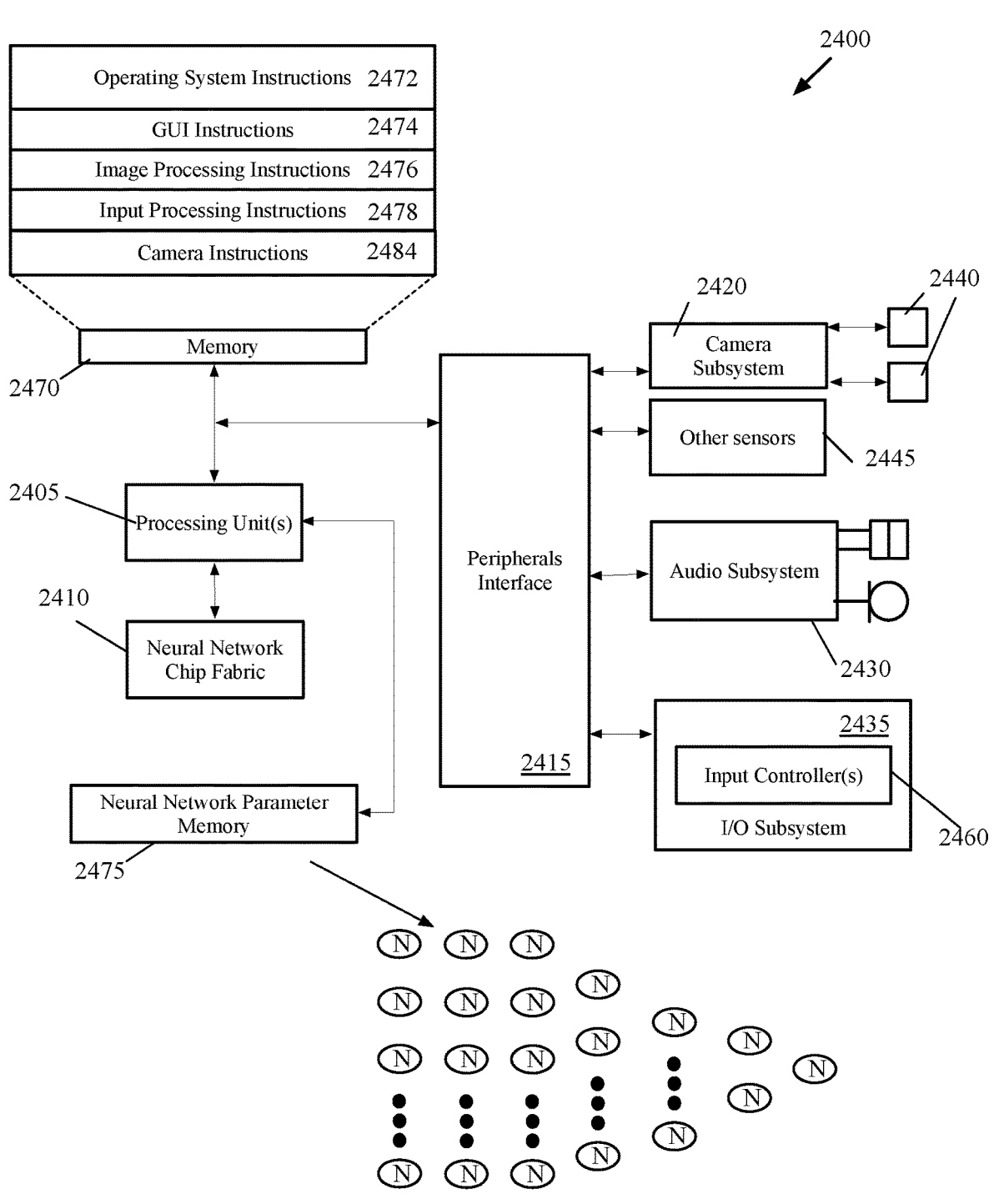
FIG. 24 illustrates an example of the architecture of a mobile computing device that stores neural network processing instructions.

FIG. 24 is an example of an architecture 2400 of an electronic device that includes a neural network integrated circuit of some embodiments. The electronic device may be a mobile computing device such as a smartphone, tablet, laptop, etc., or may be another type of device (e.g., an IoT device, a personal home assistant). As shown, the device 2400 includes one or more general-purpose processing units 2405, a neural network chip fabric 2410, and a peripherals interface 2415.

The peripherals interface 2415 is coupled to various sensors and subsystems, including a camera subsystem 2420, an audio subsystem 2430, an I/O subsystem 2435, and other sensors 2445 (e.g., motion/acceleration sensors), etc. The peripherals interface 2415 enables communication between the processing units 2405 and various peripherals. For example, an orientation sensor (e.g., a gyroscope) and an acceleration sensor (e.g., an accelerometer) can be coupled to the peripherals interface 2415 to facilitate orientation and acceleration functions. The camera subsystem 2420 is coupled to one or more optical sensors 2440 (e.g., charged coupled device (CCD) optical sensors, complementary metal-oxide-semiconductor (CMOS) optical sensors, etc.). The camera subsystem 2420 and the optical sensors 2440 facilitate camera functions, such as image and/or video data capturing.

The audio subsystem 2430 couples with a speaker to output audio (e.g., to output voice navigation instructions). Additionally, the audio subsystem 2430 is coupled to a microphone to facilitate voice-enabled functions, such as voice recognition, digital recording, etc. The I/O subsystem 2435 involves the transfer between input/output peripheral devices, such as a display, a touch screen, etc., and the data bus of the processing units 2405 through the peripherals interface 2415. The I/O subsystem 2435 various input controllers 2460 to facilitate the transfer between input/output peripheral devices and the data bus of the processing units 2405. These input controllers 2460 couple to various input/control devices, such as one or more buttons, a touchscreen, etc.

In some embodiments, the device includes a wireless communication subsystem (not shown in FIG. 24) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 24, a memory 2470 (or set of various physical storages) stores an operating system (OS) 2472. The OS 2472 includes instructions for handling basic system services and for performing hardware dependent tasks. The memory 2470 also stores various sets of instructions, including (1) graphical user interface instructions 2474 to facilitate graphic user interface processing; (2) image processing instructions 2476 to facilitate image-related processing and functions; (3) input processing instructions 2478 to facilitate input-related (e.g., touch input) processes and functions; and (4) camera instructions 2484 to facilitate camera-related processes and functions. The processing units 2405 execute the instructions stored in the memory 2470 in some embodiments.

The memory 2470 may represent multiple different storages available on the device 2400. In some embodiments, the memory 2470 includes volatile memory (e.g., high-speed random access memory), non-volatile memory (e.g., flash memory), a combination of volatile and non-volatile memory, and/or any other type of memory.

The instructions described above are merely exemplary and the memory 2470 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 2475 stores the weight values, bias parameters, etc. for implementing one or more machine-trained networks by the neural network chip fabric 2410. In some embodiments, different clusters of the fabric 2410 can implement different machine-trained networks in parallel in some embodiments. In different embodiments, these neural network parameters are stored on-chip (i.e., in memory that is part of the neural network chip fabric 2410) or loaded onto the IC 2410 from the neural network parameter memory 2475 via the processing unit(s) 2405.

While the components illustrated in FIG. 24 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 2405 and the neural network IC 2410, which enables the processing units 2405 to provide inputs to the neural network IC 2410 and receive the outputs of the network from the IC 2410. Also, while many of the functions have been described as being performed by one component, one of ordinary skill in the art will realize that the functions described with respect to FIG. 24 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 25:
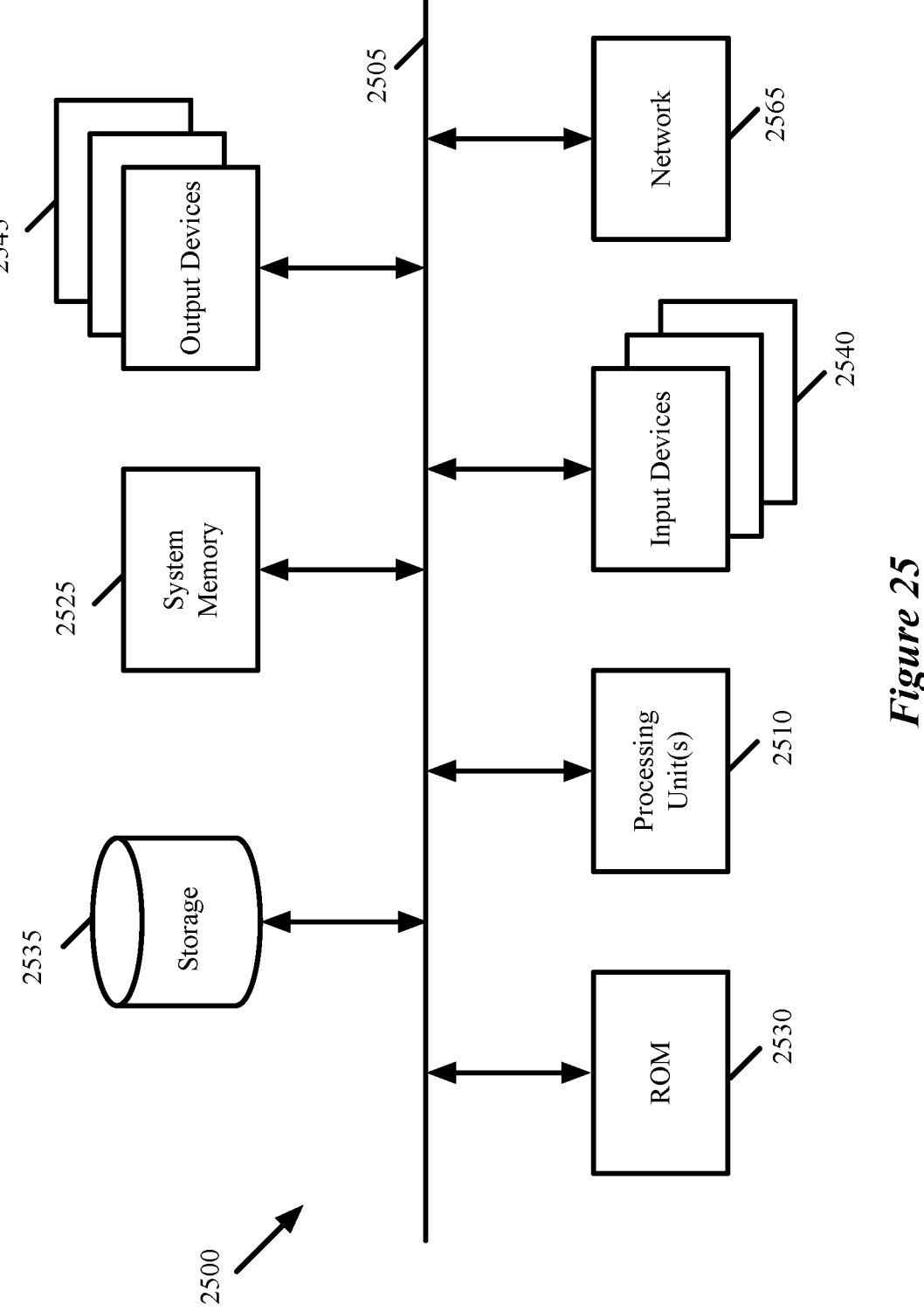
FIG. 25 conceptually illustrates an electronic system with which some embodiments of the invention are implemented.

FIG. 25 conceptually illustrates an electronic system 2500 with which some embodiments of the invention are implemented. The electronic system 2500 can be used to execute any of the applications (e.g., the training application) described above. The electronic system 2500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2500 includes a bus 2505, processing unit(s) 2510, a system memory 2525, a read-only memory 2530, a permanent storage device 2535, input devices 2540, and output devices 2545.

The bus 2505 collectively represents all system, peripheral, and chipset buses that communicatively connect the numerous internal devices of the electronic system 2500. For instance, the bus 2505 communicatively connects the processing unit(s) 2510 with the read-only memory 2530, the system memory 2525, and the permanent storage device 2535.

From these various memory units, the processing unit(s) 2510 retrieves instructions to execute and data to process in order to execute the processes of the invention. The processing unit(s) may be a single processor or a multi-core processor in different embodiments and may include generic CPUs as well as graphics processing units (GPUs).

The read-only-memory (ROM) 2530 stores static data and instructions that are needed by the processing unit(s) 2510 and other modules of the electronic system. The permanent storage device 2535, on the other hand, is a read-and-write memory device. This device is a non-volatile memory unit that stores instructions and data even when the electronic system 2500 is off. Some embodiments of the invention use a mass-storage device (such as a magnetic or optical disk and its corresponding disk drive) as the permanent storage device 2535.

Other embodiments use a removable storage device (such as a floppy disk, flash drive, etc.) as the permanent storage device. Like the permanent storage device 2535, the system memory 2525 is a read-and-write memory device. However, unlike storage device 2535, the system memory is a volatile read-and-write memory, such a random-access memory. The system memory stores some of the instructions and data that the processor needs at runtime. In some embodiments, the invention's processes are stored in the system memory 2525, the permanent storage device 2535, and/or the read-only memory 2530. From these various memory units, the processing unit(s) 2510 retrieves instructions to execute and data to process in order to execute the processes of some embodiments.

The bus 2505 also connects to the input and output devices 2540 and 2545. The input devices enable the user to communicate information and select commands to the electronic system. The input devices 2540 include alphanumeric keyboards and pointing devices (also called "cursor control devices"). The output devices 2545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 25, bus 2505 also couples electronic system 2500 to a network 2565 through a network adapter (not shown). In this manner, the computer can be a part of a network of computers (such as a local area network ("LAN"), a wide area network ("WAN"), or an Intranet, or a network of networks, such as the Internet. Any or all components of electronic system 2500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 12, 20, and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for executing a machine-trained (MT) network comprising a plurality of layers, the method comprising:

receiving and storing input data for the MT network comprising a plurality of input channels;

storing, by a first dot product core, a first activation value for a first layer of the MT network in a first memory address of the first dot product core, the first activation value associated with a first coordinate and a first input channel, and storing, by a second dot product core, a second activation value for the first layer of the MT network in a second memory address of the second dot product core, where the second memory address is the same as the first memory address, the second activation value associated with the first coordinate and a second input channel, wherein the first activation value and the second activation value are associated with a first block of the input data;

computing, by the first dot product core and the second dot product core and based on the first activation value and the second activation value, a first intermediate value by propagating the first block of input data through a first set of layers of the MT network, wherein the first set of layers comprises a plurality of convolutional layers;

computing, by the first dot product core and the second dot product core, a second intermediate value by propagating a second block of input data through the first set of layers of the MT network, wherein the second block of input data is distinct from the first block of input data;

combining the first intermediate value and the second intermediate value into a set of intermediate data; and propagating the set of intermediate data together through a second set of layers of the MT network to generate output data for the input data.

2. The method of claim 1, wherein the MT network is trained by propagating training input sets together through the entire network without dividing the training input sets into blocks of the input data.

3. The method of claim 1, wherein:

each of the first set of layers and the second set of layers comprises at least one convolutional layer; and at least one of the first set of layers and the second set of layers comprises a pooling layer.

4. The method of claim 1, wherein:

the MT network is executed by a neural network inference circuit comprising a fixed amount of memory for weight values and intermediate activation values; and separately propagating blocks of the input data reduces a portion of the memory allocated to the intermediate activation values, thereby increasing a portion of the memory available to the weight values.

5. The method of claim 4, wherein the weight values are ternary weight values such that each weight is stored in the memory as one of $\{0, 1, -1\}$, wherein increasing the portion of the memory available to the weight values enables an increase in a percentage of the weight values that are non-zero, thereby increasing accuracy of the output data generated by the MT network.

6. The method of claim 4, wherein the first set of layers comprises layers with the largest numbers of intermediate activation values in the MT network.

7. The method of claim 4, wherein:

a block of intermediate data comprising the first intermediate value and the second intermediate value is stored in one or more contiguous blocks of the memory comprising a second block of intermediate data; and combining the first block of intermediate data and the second block of intermediate data comprises moving at least a subset of each block of intermediate data within the memory.

8. The method of claim 4, wherein a subset of the fixed amount of the memory of the neural network inference circuit is reused for propagation of each block of the input data through the first set of layers of the MT network.

9. The method of claim 1, wherein each channel comprises an equally-sized grid of input values arranged in rows and columns.

10. The method of claim 9, wherein each respective block of the input data comprises respective input values from a respective block of rows of the respective input values across all channels.

11. The method of claim 10, wherein the respective block of rows overlaps a second block of rows such that a subset of rows belongs to two different input blocks.

12. The method of claim 11, wherein the overlap is based on a receptive field within the input values of kernels of a final layer in the first set of layers.

13. The method of claim 1, wherein computing the first intermediate value comprises:

propagating the first block of the input data through the first set of layers to generate the first block of intermediate data and storing the first block of intermediate data in memory;

after storing the first block of intermediate data in memory and prior to combining the first intermediate value and the second intermediate value or propagating the set of intermediate data through the second set of the layers of the MT network, propagating a second block of the input data through the first set of layers to generate the second block of intermediate data and storing the second block of intermediate data in the memory.

14. A non-transitory machine-readable medium storing a program which when executed by a neural network inference circuit causes the neural network inference circuit to execute a machine-trained (MT) network comprising a plurality of layers, the program comprising sets of instructions for:

receiving and storing input data for the MT network comprising a plurality of input channels;

storing, by a first dot product core, a first activation value for a first layer of the MT network in a first memory address of the first dot product core, the first activation value associated with a first coordinate and a first input channel, and storing, by a second dot product core, a second activation value for the first layer of the MT network in a second memory address of the second dot product core, where the second memory address is the same as the first memory address, the second activation value associated with the first coordinate and a second input channel, wherein the first activation value and the second activation value are associated with a first block of the input data;

computing, by the first dot product core and the second dot product core and based on the first activation value and the second activation value, a first intermediate value by propagating the first block of input data through a first set of layers of the MT network, wherein the first set of layers comprises a plurality of convolutional layers;

computing, by the first dot product core and the second dot product core, a second intermediate value by propagating a second block of input data through the first set of layers of the MT network, wherein the second block of input data is distinct from the first block of input data;

combining the first intermediate value and the second intermediate value into a set of intermediate data; and propagating the set of intermediate data together through a second set of layers of the MT network to generate output data for the input data.

15. The non-transitory machine-readable medium of claim 14, wherein the MT network is trained by propagating training input sets together through the entire network without dividing the training input sets into blocks of the input data.

16. The non-transitory machine-readable medium of claim 14, wherein the neural network inference circuit comprises a fixed amount of memory for weight values and intermediate activation values.

17. The non-transitory machine-readable medium of claim 16, wherein:

separately propagating blocks of the input data reduces a portion of the memory allocated to the intermediate activation values, thereby increasing a portion of the memory available to the weight values;

the weight values are ternary weight values such that each weight is stored in the memory as one of $\{0, 1, -1\}$; and increasing the portion of the memory available to the weight values enables an increase in a percentage of the weight values that are non-zero thereby increasing accuracy of the output data generated by the MT network.

18. The non-transitory machine-readable medium of claim 16, wherein:

a block of intermediate data comprising the first intermediate value and the second intermediate value is stored in one or more contiguous blocks of the memory comprising a second block of intermediate data; and the set of instructions for combining each block of intermediate data comprises a set of instructions for moving at least a subset of each block of intermediate data within the memory.

19. The non-transitory machine-readable medium of claim 14, wherein:

each channel comprises an equally-sized grid of input values arranged in rows and columns; and each respective block of the input data comprises respective input values from a respective block of rows of the respective input values across all channels.

20. The non-transitory machine-readable medium of claim 19, wherein:

the respective block of rows overlaps a second block of rows such that a subset of rows belongs to two different input blocks; and the overlap is based on a receptive field within the input values of kernels of a final layer in the first set of the plurality of layers.

* * * * *